(12) United States Patent
Ndumu et al.

(10) Patent No.: US 6,314,555 B1
(45) Date of Patent: Nov. 6, 2001

(54) SOFTWARE SYSTEM GENERATION

(75) Inventors: Divine T Ndumu; Hyacinth S Nwana, both of Suffolk; Lyndon C Lee, Colchester, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/125,727

(22) PCT Filed: Jul. 27, 1998

(86) PCT No.: PCT/GB98/02241

§ 371 Date: Aug. 25, 1998

§ 102(e) Date: Aug. 25, 1998

(87) PCT Pub. No.: WO99/05593

PCT Pub. Date: Feb. 2, 1999

(30) Foreign Application Priority Data

Jul. 25, 1997 (EP) ................................................. 97305600

(51) Int. Cl.⁷ ....................................................... G06F 9/94
(52) U.S. Cl. ............................ 717/1; 709/202; 709/316; 709/317; 706/49; 706/50; 706/59; 706/922
(58) Field of Search .................................. 706/47, 49, 50, 706/60, 62, 914, 919, 92.2, 59; 717/1–4, 10; 709/102, 104, 106, 202, 227, 317, 316, 328, 332; 705/80; 707/10, 104

(56) References Cited

U.S. PATENT DOCUMENTS

| | | | |
|---|---|---|---|
| 5,421,013 | * 5/1995 | Smith | 709/107 |
| 5,596,750 | * 1/1997 | Li et al. | 709/101 |
| 5,758,160 | * 5/1998 | McInerney et al. | 395/701 |
| 5,790,789 | * 8/1998 | Suarez | 709/202 |
| 5,812,844 | * 9/1998 | Jones et al. | 709/104 |
| 5,819,243 | * 10/1998 | Rich et al. | 706/11 |
| 5,822,585 | * 10/1998 | Noble et al. | 709/316 |
| 5,826,020 | * 10/1998 | Randell | 709/202 |
| 5,931,907 | * 8/1999 | Davies et al. | 709/218 |

OTHER PUBLICATIONS

Erman et al., "ABE: An Environment for Engineering Intelligent Systems," IEEE Transactions on Software Engineering, vol. 14, Issue 12, Dec. 1998, pp. 1758–1770.*

Hayes–Roth et al., "Domain–Specific Software Architectures: Distributed Intelligent Control and Management," IEEE Symp. on Computer–Aided Control System Design, Mar. 17–19, 1992, pp. 117–128.*

Barbuceanu et al., "The Information Agent: An Infrastructure Agent Supporting Collaborative Enterprise Architectures," Proceedings., Third Workshop on Enabling Technologies: Infrastructure for Collaborative Enterprises, Apr. 17–19, 1994, pp. 112–116.*

(List continued on next page.)

*Primary Examiner*—Tuan Q. Dam
(74) *Attorney, Agent, or Firm*—Nixon & Vanderhye P.C.

(57) ABSTRACT

A system for building collaborative software agents is provided with a set of editors for capturing data for installation in the individual agents. The collaborative software agents will normally form a community, including some standard agents, provided by the system, and will collaborate to provide functionality in a domain selected by the user. Each collaborative software agent built by the system is provided with co-ordination policies, selected by the user, and represented by a co-ordination graph. A single collaborative software agent can be provided with more than one collaborative policy and is capable of running more than one collaborative policy simultaneously with different agents of the system. An exception handler flags an exception during use of the collaborative agents in the relevant domain when the value of a variable for an agent conflicts with a relevant constraint. Alternatively, the exception handler flags an exception when the resource and time constraints cannot be met by allocation of tasks between the collaborative agents. Communities of software agents built within a system might be used to launch and/or manage telecommunications services or to control a chemical process, for example.

40 Claims, 12 Drawing Sheets

OTHER PUBLICATIONS

Finin et al., "KQML as an Agent Communication Language," Proceedings., Third International Conference on Information and Knowledge Management (CIKM'94), ACM Press, Nov. 1994, pp. 1–9.*

Benjamin N. Grosof, "Conflict Resolution in Advice Taking and Instruction for Learning Agents," IBM Research Report RC 20123 Jun. 30, 1995, World Wide Web: http://www.watson.ibm.com.*

Chess et al., "Itinerant Agents for Mobile Computing," IEEE Personal Communications, vol. 2, Issue 5, Oct. 1995, pp. 34–49.*

Grosoft et al., "Reusable Architecture for Embedding Rule–based Intelligence in Information Agents," IBM Research Report RC 20305, Dec. 5, 1995, pp. 1–9, W W W: http://www.research.ibm.com.*

"Reticular Systems to Develop Java TM–based Agent-Builder TM" Press Release [online]. Reticular Systems Inc., 1996[retrieved on Jan. 14, 2000]. Retrieved from the internet.*
<URL:www.reticular.com/PressReleases/Dec. 3, 1996.html>.*

Franklin et al., "Is it an Agent, or just a Program?: A Taxonomy for Autonomous Agents," Proceedings., Third Int'l. Workshop on Agent Theories, Architectures, and Languages, Springer–Verlag, 1996, pp. 1–10.*

"Aglets Software Development Kit News, "Aglets News [online]. IBM Company, 1999[retrieved on Jan. 19, 2000]. Retrieved from the Internet:<URL:www.trl.ibm.co.jp/aglets/whatsnew.html>, pp. 1–4.*

Danny B. Lange, Java Aglet application Programming Interface (J–AAPI) White Papaer–Draft 2, IBM Tokyo Research Laboratory, Feb. 19, 1997, pp. 1–6.*

Repenning et al., "Agentsheets: a medium for creating domain–oriented visual languages," Computer Vo. 28, Issue 3, Mar. 1995, pp. 17–25.*

Lange et al., "Agent Transfer Protocol—ATP/0.1" IBM Tokyo Research Laboratory, Draft number:4, Mar. 19, 1997, pp. 1–13.*

Bret Sommers, "Agents: Not just for Bond anymore," Java-World, Apr. 1997, pp. 1–14.*

Bill Venners, "Under the Hood: The architecture of Aglets," JavaWorld Apr. 1997, pp. 1–7.*

Bill Venners, "Solve real problems with aglets, a type of mobile agent," JavaWorld May 1997, pp. 1–8.*

Benjamin N. Grosof, Building Commersial Agents: An IBM Research Perspective (Invited Talk), IBM Research Report, RC 20835 (92272), May 8, 1997, pp. 1–6.*

* cited by examiner

FIG. 6
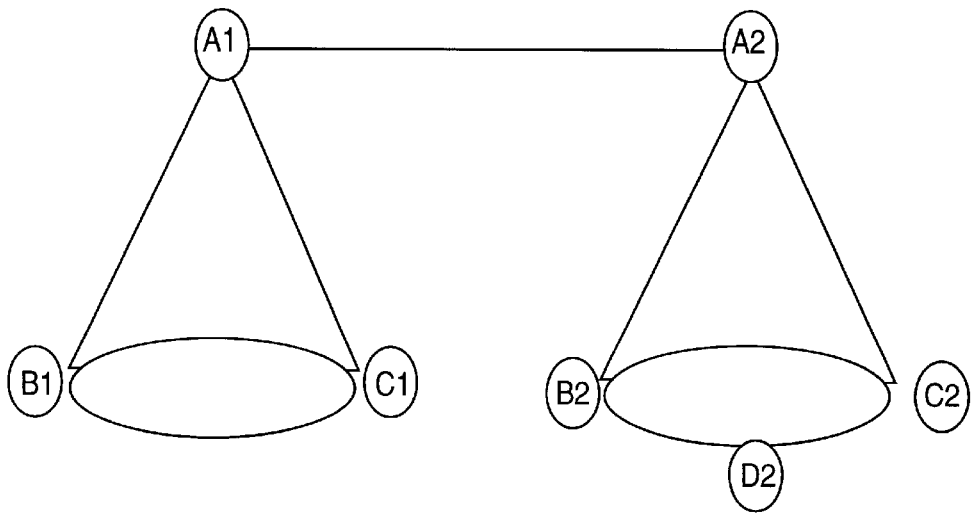
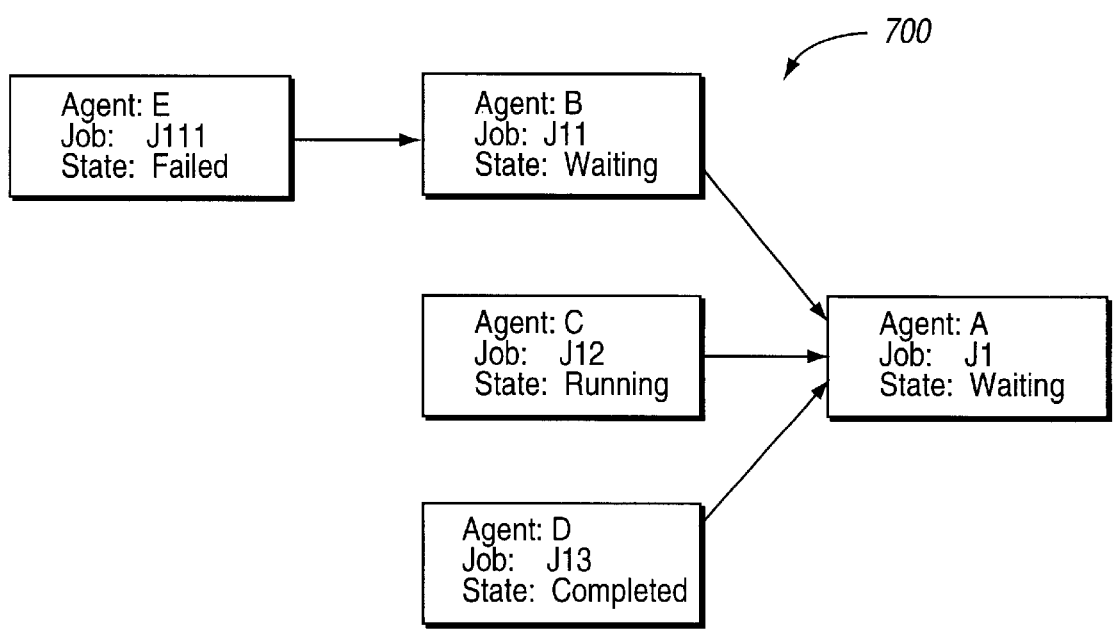
FIG. 7

FIG. 8
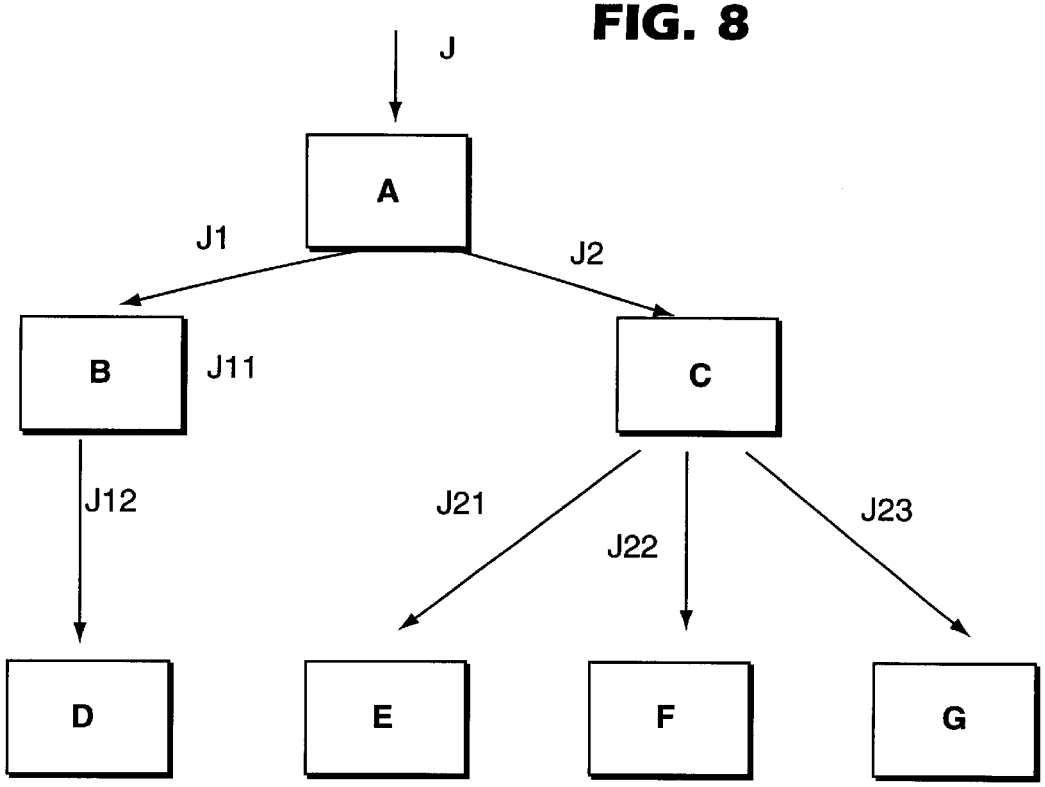
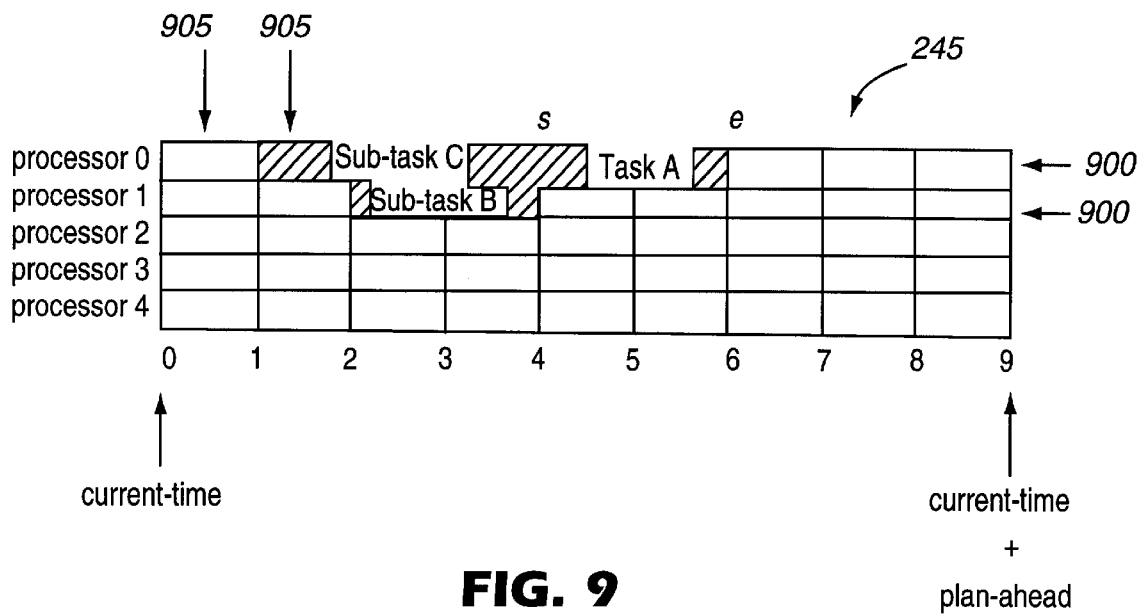
FIG. 9

SOFTWARE SYSTEM GENERATION

BACKGROUND OF THE INVENTION

1. Field of the Invention

The present invention relates to software system generation and finds an application for instance in building communications systems.

2. Related Art

Software agent technology has developed over the past few years in several different fields. A software agent is a computer program which acts as an agent for an entity such as a user, a piece of equipment or a business. The software agent usually holds data in relation to the entity it represents, has a set of constraints or conditions to determine its behaviour and, most importantly, is provided with decision making software for making decisions on behalf of the entity within or as a result of the constraints and conditions. Agents are generally acting within a system and the decisions an agent makes can result in activity by the system. In control software systems, those decisions result in control activity, such as initiating connection set-up in a communications network controlled by the system.

An agent acting within a system will also generally hold data about the system so that it can operate in context.

In a distributed environment, many such agents may co-operate to co-ordinate and perform the control activities. Typically, such agents form an agent layer, with each agent interfacing with a number of external systems (the domain layer) which they control, monitor or manage, as shown in FIG. 1.

An agent-based system can be very complex since the interactions between the agents, the decision-making processes of individual agents and, the interactions between agents and the external systems they control, need to be taken into account.

Different types of agent-based systems are described in many papers, such as those published in the proceedings of the First and Second International Conferences on the Practical Application of Intelligent Agents and Multi-Agent Technology. These are published by the Practical Application Company Ltd., Blackpool, Lancashire, in 1996 and 1997 respectively. A general comprehensive review of agent-based technology is given by Hyacinth S. Nwana, "Software Agents: An Overview" in the *Knowledge Engineering Review journal*, Vol. 11, No. 3, pages 205–244.

There are ways already known for building software agents. For instance, the following publications describe agent building arrangements:

1. IBM's Agent Building Environment (ABE) which is essentially a C++ class library [http://www.networking.ibm.com/iag/iagwatsn.htm]. ABE is a tool-kit that facilitates the construction of agent-based applications or helps add an agent to existing applications. This tool-kit applies to relatively trivial "interface" agents, or agents that work alone. For example, an agent here could be one which monitors the value of stock in the financial markets and alerts its user (e.g. via paging) when the value falls below a certain threshold. ABE does not describe means for building multiple agent systems, nor do they describe means for building more than one type of agent.

2. MIT's SODABOT [http://www.ai.mit.edu/people/sodabot/sodabot.html], General Magic's Telescript and Odyssey [http://www.genmagic.com], and IBM's Aglets [http://www.trl.ibm.co.jp/aglets]. These all provide other environments which facilitate the construction of "mobile" agents-based applications. However, they are also not much more than languages, comparable to the "Java" language developed by Sun Microsystems Inc., and do not provide specific advanced agent-building arrangements.

Perhaps more relevant to embodiments of the present invention is the agent building shell work done at the University of Toronto. This is described by Mihai Barbuceanu & Mark S. Fox in the paper "*The Architecture of an Agent Building Shell*", published in 1996 in *Intelligent Agents II*, Berlin by Springer-Verlag, 1037, 235–250 and edited by Wooldridge, M., Muller, J. & Tambe, M. This work describes an agent building shell "that provides several reusable layers of languages and services for building agent systems: coordination and communication languages, description logic based knowledge management, cooperative information distribution, organisation modelling and conflict management" (page 235). This work is still very much in progress and has not yet resulted in a practical embodiment with much effort having been expended on theoretical issues such as description logics, non-monotonic logics and extending KQML to derive the language "COOL". The work of the present invention differs markedly from this in that it provides a tool-kit for defining and generating real agent-based control software for real applications, and goes well beyond the general academic nature of the Toronto work.

A particular problem arises with "collaborative" agents. Collaborative agents are a group of agents which co-operate with one another to co-ordinate their activities in performing a particular task. Such co-operation may be necessary because know-how, resources or processing power may be distributed across the environment or across the agents in the system. The problem with collaborative agent systems is the need to co-ordinate their activities in a problem- and context-dependent manner.

An example of a collaborative agent system, used in this case in communications network management, is described in international patent application number WO95/15635, in the name of the present applicant.

SUMMARY OF THE INVENTION

According to a first aspect of the present invention, there is provided a software building environment, for building a software system for use in control, monitoring and/or management of a process or apparatus, said environment comprising at least one software module, means for capturing data for loading a copy of said module for use in said software system, and means for generating the software system comprising at least two of said loaded modules.

Each loaded software module preferably comprises a collaborative software agent. It will therefore comprise or have access to at least one collaboration or co-ordination strategy, expressed for instance as a rule or algorithm. Said at least two loaded modules together can then provide a multiple agent community for controlling, monitoring and/or managing the process.

Embodiments of the present invention can provide collaborative agent building environments with which system developers can define a set of agents to work together in a system, organise them in relation to one another in whatever manner they choose, imbue them with co-ordination abilities suitable for the problems the agents are being designated to tackle, support links from the agents to said process or apparatus they need to communicate with, to control or update for instance, and generate the software code for the agents.

It is not necessary that all the loaded software modules are the same. Indeed, usually at least some of them will hold different data sets because they represent different entities. Preferably, the software building environment provides, or provides access to, more than one collaboration or co-ordination strategy. In use of the environment, the developer can then load a different collaboration or co-ordination strategy to at least one module for use in the system.

More preferably, the software module is capable of having loaded therein more than one collaboration or co-ordination strategy such that its collaboration or co-ordination behaviour in the system is flexible. That is, it can operate according to one collaboration or co-ordination strategy at one time and another collaboration or co-ordination strategy at another time.

The software module may also or instead be capable of operating according to more than one collaboration or co-ordination strategy at once.

According to a second aspect of the present invention, there is provided a software system for use in control, monitoring and/or management of a process or apparatus, wherein said system comprises at least two software modules, each module comprising data and/or process information which comprises:

(i) organisation data concerning an inter-module relationship; and (ii) executable software providing a collaboration or co-ordination strategy, expressed for instance as a rule or algorithm;

wherein, in use, a module selects said executable software for use in negotiating with another software module in relation to task allocation, said selection being determined at least in part by said organisation data.

According to a third aspect of the present invention, there is provided a software module for use in a software system for distributed control, monitoring and/or management of a process or apparatus, the module comprising:

(i) communication means for communicating with other software modules;

(ii) executable software for use in coordinating with other software modules in the selection of tasks to be allocated to respective software modules for controlling or carrying out; and (iii) a data store, or access to a data store, for storing task definitions including time data indicating task execution times, said module further comprising scheduling means for storing data selected from at least one of said task definitions, including said time data for the respective task definition or definitions.

This scheduling means can be used by the software system for allocating tasks amongst a plurality of software modules during control, monitoring and/or management of a process or apparatus.

The scheduling means for one software module may store data from more than one task definition, ordering the data so as to determine the order in which, in use of the system, the software module will control or carry out the relevant task.

Advantageously, the scheduling means may store the task data together with an indicator of status selected from at least two alternative statuses such as "tentative" and "firm". The indicator of status may be used by the scheduler to determine modes of managing such data. For instance, the scheduler may operate a time-out in relation to task data having the status "tentative", after which the data is deleted or can be overwritten by subsequent incoming data.

Particularly advantageously, the scheduling means may overbook resources by storing data from more than one task definition, said data storing overlapping time contraints.

According to a fourth aspect of the present invention, there is provided a visualisation arrangement for use in a software system for controlling, monitoring or managing a process or arrangement, said software system comprising a plurality of software modules provided with means to communicate with each other, wherein the visualisation arrangement comprises means to store and provide for display communication instances, or data relating thereto, occurring in relation to a single, selected software module, and means to store and provide for display communication instances, or data relating thereto, occurring between at least two of said software modules.

A debugging arrangement which allows the user to choose to review communications relevant either to a single software module, or to a community of communicating software modules, or to both, can offer a very effective debugging mechanism to the user.

Preferably, the visualisation arrangement is provided with means for obtaining organisational data in relation to the software modules, and with means for processing the communications instances or data prior to display, such that said communications instances, or data relating thereto, can be displayed in a manner determined by the organisational data.

It is also advantageous if the visualisation arrangement is provided with means to access data or executable software code held in one or more of the software modules, to download said data or code, to provide said data or code for modification and to load modified data or code to the software module. The data or code may be modified by editing means provided within the visualisation arrangement itself, or by separate editing means.

It should be noted that there are several novel and innovative features of the embodiments of the present invention described below, not all of which are necessarily referred to above, and at least some of which have applicability independently of other aspects of said embodiments.

It should also be noted that, in a distributed environment, software modules in practice may not themselves comprise data or software, such as collaboration or co-ordination strategies as mentioned above. They may instead simply have access to them, for instance for loading at the relevant run-time. These arrangements should be taken as covered by the above.

BRIEF DESCRIPTION OF THE DRAWINGS

An agent building system tool-kit known as the Collaborative Agent Building System ("CABS") will now be described, by way of example only, as an embodiment of the present invention, with reference to the accompanying drawings, in which:

FIG. 6 shows possible organisational relationships between software agents built using CABS;

FIG. 7 shows data obtained using a debugging tool for debugging an agent-based control system built using CABS;

FIG. 8 shows a scenario for debugging using the debugging tool for debugging a CABS agent system;

FIG. 9 shows a commitment table for an agent according to FIG. 2;

In the following description, an agent-based system is described, together with an environment for building it.

DETAILED DESCRIPTION OF EXEMPLARY EMBODIMENTS

1. AN AGENT-BASED SYSTEM BUILT USING THE CABS TOOL-KIT

Figure 1:
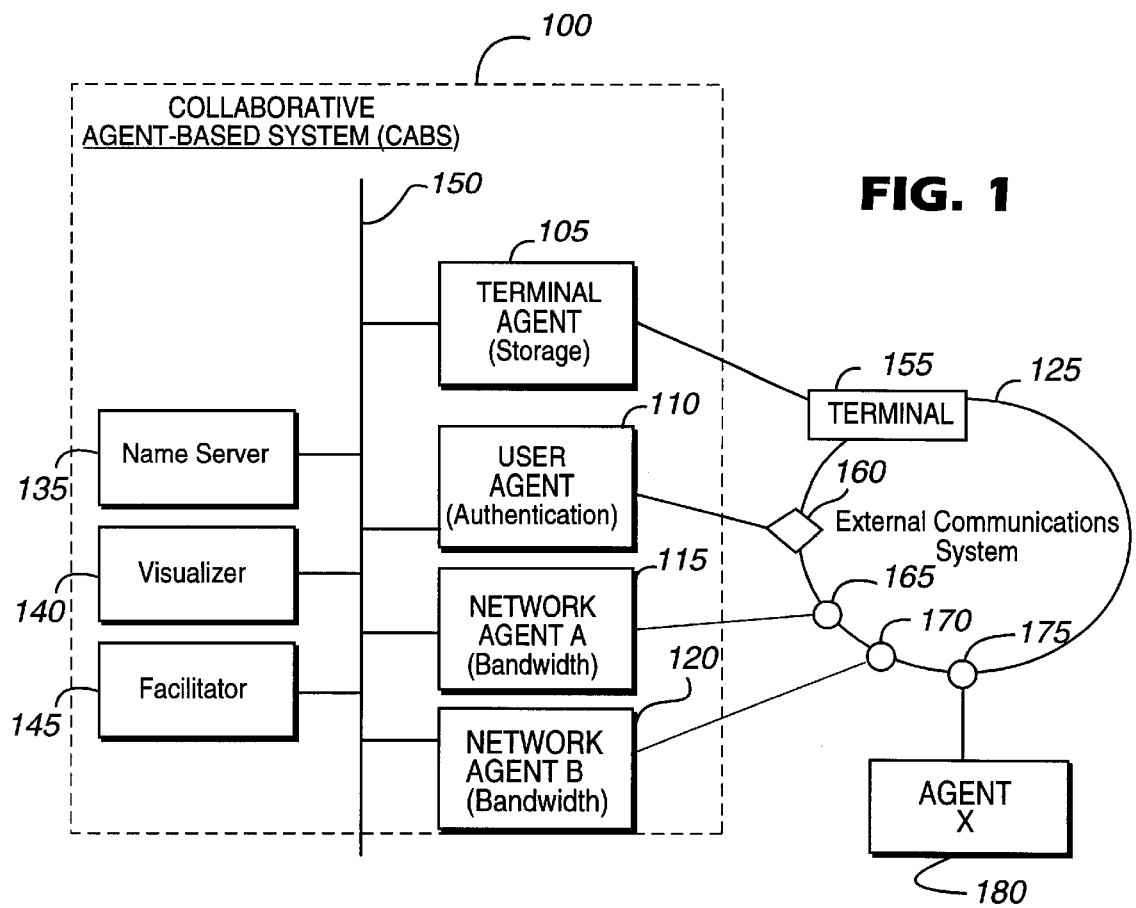
FIG. 1 shows an agent-based control system, built using CABS, as it interfaces with external hardware and/or software.

The system shown in FIG. 1 is an example of an agent-based system for use in communications. A CABS platform could however be used for building almost any agent-based system where software agents need both to collaborate with other agents and to perform tasks which result in some output. The output in the example of FIG. 1 is control of service provision by means of components of a communications system. The output could alternatively be data generation or control of a production process for instance and other examples are used elsewhere in this specification.

The system comprises a set of classes (in the object-oriented technology sense) implemented in the Java programming language, allowing it to run on a variety of hardware platforms. Java is a good choice of language for developing multi-agent applications because it is object-oriented and multi-threaded, and each agent may consist of many objects and several threads. It also has the advantage of being portable across operating systems, as well as providing a rich set of class libraries that include excellent network communication facilities.

The classes of the system can be categorised into three primary functional groups—an agent component library, an agent building tool and an agent visualisation tool.

The agent component library comprises Java classes that form the "building blocks" of individual agents. These together implement the "agent-level" functionality required for a collaborative agent. Thus for instance for communications, reasoning, inter-agent co-operation and the ability to participate in goal-driven interactions between agents, the system provides:

A performative-based inter-agent communication language

Knowledge representation and storage using ontologies

An asynchronous socket-based message passing system

A planning and scheduling system

An event model together with an applications programming interface (API) that allows programmers to monitor changes in the internal state of an agent, and to control its behaviour externally A co-ordination engine A library of predefined co-ordination protocols A library of predefined organisational relationships It further provides support agents of known general type such as name-servers, facilitators (classified directories), and visualisers.

Preferably, components of the system use standard technologies wherever possible, such as communicating through TCP/IP sockets using a language based on the Knowledge Query Management Language (KQML).

Further descriptions of these aspects can be found below.

In the following, the terms "goal", "task" and "job" are used. These are defined as follows:

A "goal": a logical description of a resource (fact) which it is intended an agent should produce;

A "task": a logical description of a process which uses zero or more resources and produces one or more resources; and A "job": refers to a goal or task depending on the context. (For instance, in the context of the visualiser 140 discussed below under the heading "5. DEBUGGING AND VISUALISATION", it refers to goals.)

Referring to FIG. 1, an agent-based system 100, built using the CABS platform, comprises a set of communicating agents 105, 110, 115, 120 for controlling/representing entities in an external system, together with a set of infrastructure agents 135, 140, 145.

The agents of the system 100 communicate with each using a network such as a Local Area Network 150. They might alternatively communicate using capacity in the external system itself.

External to the agent system 100, there is a communications system 125 with various components. There is within the external system 125, for instance, a terminal 155, a software application providing authentication 160 and several network links 165, 170, 175. One of the network links 175 is provided with an external agent 180 which is separate from the agent-based system 100 built using the CABS platform.

The CABS agents 105, 110, 115, 120 have various tasks to carry out and resources to control. The agents will need both to collaborate together and to carry out tasks. The tasks will include those directly involved in providing services to a user but may also include auxiliary tasks.

In an example, in the system shown, if the user wants data downloaded to the terminal 155, the user agent 110 will have the task of providing an authentication resource 160, the terminal agent 105 will have the task of providing sufficient storage for the data at the terminal 155 and the network agents 115, 120 will have the task of providing network bandwidth to carry the data to the terminal 155. The network agents 115, 120 will also need to collaborate with each other, for instance by bidding against one another in terms of cost, time and quality of service to provide the network bandwidth.

After an inter-agent collaboration stage, the agents 105, 110, 115, 120 will carry out the tasks by outputting control messages to the components of the system 125 they control. The terminal agent 105 must therefore control the terminal 155 so as to provide the storage capacity it has agreed to provide. The user agent 110 must launch the authentication application 160. One of the two network agents 120 must provide the bandwidth, agreed as a result of the collaboration, on its respective network link 170.

During their activities, the agents 105, 110, 115, 120 will have access to common resources within the CABS agent system 100, including for instance the infrastructure agents mentioned above; a name server agent 135, a debugging/fault finding agent 140, referred to here as a visualiser, and a facilitator agent 145.

The separate agent 180, controlling a network link 175 of the external system 125, may provide back up to the network agents 115, 120 of the CABS system 100, in the event that bandwidth is not available through network links directly controlled by the CABS built agents 115, 120. It will be clear in that circumstance that the CABS agents 105, 110, 115, 120 will need to share a common communication language with the separate agent X 180, together with some sort of co-ordination protocol. Communication with the external agent 180, for instance to obtain capacity on its link as a backup resource, could be allocated as a task to any one or more of the CABS agents.

2. STRUCTURE OF A SINGLE AGENT BUILT USING CABS PLATFORM/TOOL-KIT

Figure 2:
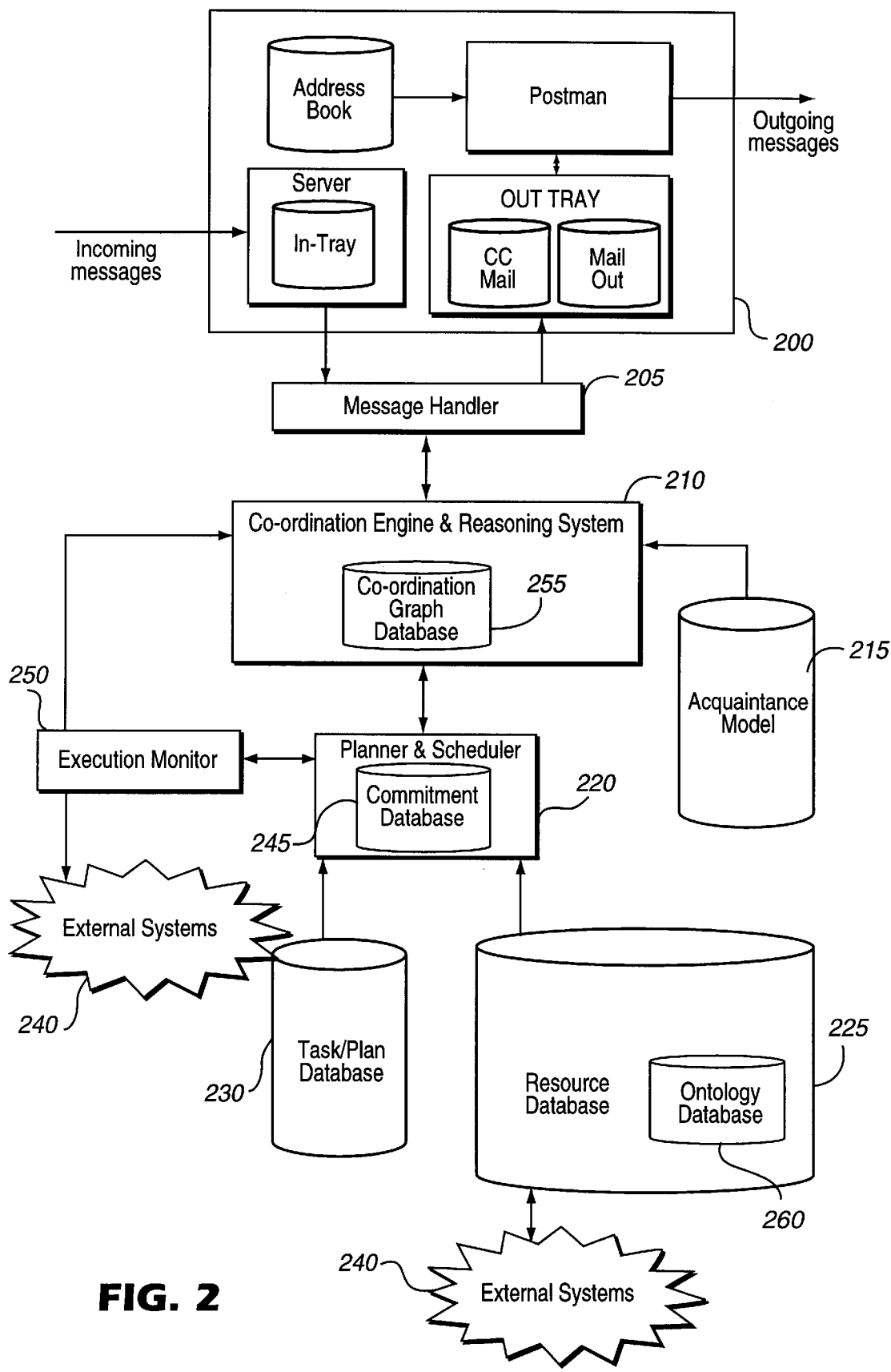
FIG. 2 shows a schematic architecture for a software module constituting an agent for distributed control, monitoring and management of a system.

Referring to FIG. 2, the internal structure of a single, collaborative agent which can be built using CABS, for distributed control, monitoring and management of external systems 240, comprises:

(i) a mail box 200 or communicating device which handles communications between the software module and other internal or external software or hardware systems;

(ii) a message handler 205 which processes messages incoming from the mail box 200, dispatching them to other components in the architecture;

(iii) a co-ordination engine and reasoning system 210 which takes decisions concerning the goals the agent should be pursuing, how said goals should be pursued, when to abandon them etc., and how to co-ordinate the agent's activities with respect to other CABS agents in the system. The co-ordination engine and reasoning system contains both an engine and a database of coordination processes 255;

(iv) an acquaintance model 215 which describes the agent's knowledge about the capabilities of other agents in the system;

(v) a planner and scheduler 220 which plans and schedules the tasks the agent is controlling, monitoring or managing based on decisions taken by the co-ordination engine and reasoning system 210 and the resources and tasks available to be controlled, monitored and/or managed by the agent;

(vi) a resource database 225 containing logical descriptions of the resources currently available to the agent; and providing an interface between the database and external systems such that the database can query external systems about the availability or resources and inform external systems when resources are no longer needed by the agent, and external systems can on their own initiative add, delete or modify resource items in the database, thus initiating changes in the agent's behaviour;

(vii) a task database 230 which provides logical descriptions of tasks available for control, monitoring and/or management by the agent; and (viii) an execution monitor 235 which starts, stops, and monitors external systems tasks scheduled for execution or termination by the planner and scheduler, and which informs the co-ordination engine and reasoning system 210 of successful and exceptional terminating conditions to the tasks it is monitoring.

When the agent is built, the developer uses various CABS-provided editors to provide descriptions required for various modules of the agent architecture including the coordination and reasoning engine 210, the acquaintance model 215, the resource database 225 and the task database 230.

In use, the agent is driven by events which cause the agent's state to change. The agent will run an event model provided by the component library of the system to monitor these internal changes, making them visible to a programmer via an API. There are three possible external event sources (see FIG. 2): external messages from other agents into the Mailbox 200 (e.g requests for a service), external events initiated from the Execution Monitor 250 monitoring external systems 240 (e.g. from various sensors) and external events initiated from changes to the Resource Database 225. For example, if there is an event which changes the state of the agent, such as loss of a resource, it will need to update its records accordingly.

A change in state may initiate a sequence of activities within and/or outside the particular agent. For example, losing a resource (e.g. through failure) which is required to provide some service would require the Planner & Scheduler module 220 to attempt to secure another resource which may be able to do the same job. If it succeeds, all activities as a result of the loss of the resource can be contained within the agent. However, if the Planning and Scheduling module 220 cannot locate another local resource, the Coordination Engine and Reasoning System 210 will be called upon to attempt either to secure the resource from some other agent or delegate/contract the task which required that resource to another agent. In both cases, the Coordination Engine and Reasoning System 210 will request the Mailbox 200 via the Message Handler 205 to construct a message and despatch it to selected other agents. In this way, coordination of activities with other agents is realised.

Further details of the components of the agent structure which support the above mechanism are given below.

2.1 Mailbox 200

The mailbox 200 is implemented as a multi-threaded module with inter-agent communication via TCP/IP sockets. One thread of execution, the server thread, continuously listens for and accepts incoming TCP connection requests from other agents, receives any incoming messages from those agents and puts the received messages into an in-tray (a queue). A second thread, the client thread, opens TCP connections with other agents to deliver messages. Messages to be delivered are retrieved from an out-tray (queue). When other modules of the agent request a message to be delivered to another agent, those messages are placed on the out-tray of the mailbox to be later picked up by the client-thread. The message language used in the current implementation is the KQML agent communication language [Tim Finin, Yannis Labrou & James Mayfield (1997), KQML as an Agent Communication Language, in Bradshaw, J (Ed.), Software Agents, Cambridge Mass: MIT Press, Chapter 14, pages 291–316]

The mailbox technology is relatively standard and could have been implemented using alternative communication protocol other than TCP/IP such as electronic mail and HyperText Transfer Protocol (HTTP).

2.2 Message Handler 205

The message handler 205 continually polls the in-tray of the mailbox 200 for new incoming messages, which it dispatches to other relevant components of the agent for detailed processing. This module is based on standard technology, comprising a continuously running thread which polls the mailbox 200, and has access to handles of all the major components of the agent for dispatching messages to them.

In CABS, the format of KQML messages is as follows:

KQML [:sender :receivers :content]

Agent messages, including inter-agent communications as usually used in co-ordination in CABS, use KQML performatives, and the details of the communications are usually contained in the KQML content field. A CABS agent that puts forward a change in state to other agents (which may represent a proposal, counter-proposal, or acceptance in the CABS co-ordination protocol) uses the KQML performative "achieve". Recipient agents reply by using the KQML performative "reply" when they counter-propose and "accept" when they accept a proposal.

2.3 Co-ordination Engine And Reasoning System 210

Figure 3:
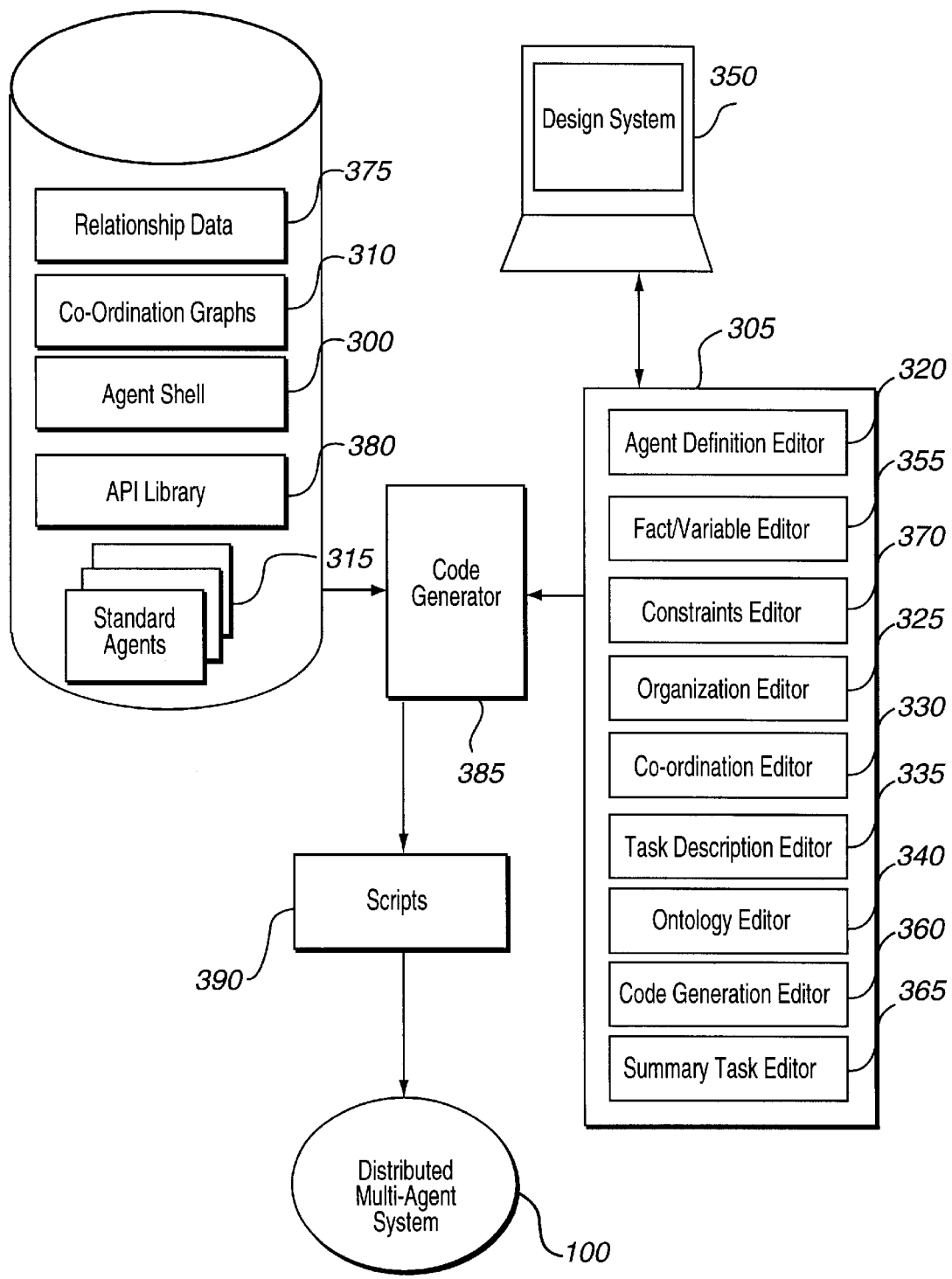
FIG. 3 shows a CABS platform for building an agent as shown in FIG. 2.

Referring to FIGS. 2 and 3, the co-ordination engine and reasoning system 210 and the planner and scheduler 220 are both unique in a CABS agent and both are now described in detail. Further reference is made to these below, in describing use of the CABS platform to design an agent system, under the headings "Step 4: Agent Coordination Strategy Specification" and "Step 2: Agent Definition" respectively, in the section entitled "4. USING THE CABS PLATFORM TO DESIGN AN AGENT SYSTEM".

Coordination is extremely important in CABS because its agents are collaborative. Collaborative software agents refer to the complex class of agents which are both autonomous and which are capable of cooperation with other agents in order to perform tasks for the entities they represent. They may have to negotiate in order to reach mutually acceptable agreements with other agents. For instance, an agent may receive a request for a resource from another agent. It will respond according to the relationship between them and according to its own particular circumstances ("state"), such as whether it has that resource available. The response forms part of an interaction process between the two agents which is determined by a "co-ordination protocol". The co-ordination engine and reasoning system 210 allows the agent to interact with other agents using one or more different co-ordination protocols, selected by the developer to be appropriate to the agent's domain.

Typically, in the past, coordination protocols have been "hardwired" into the way individual software agents work, such that changing them requires a total re-write of the entire distributed application. In a CABS system however, the agent is provided with one or more co-ordination graphs 255 and an engine 210 for executing them. Each graph comprises a set of labels for nodes together with a set of labels for arcs which identify transition conditions for going from node to node. The agent is also provided with access to a repository of the executable form of the nodes and arcs identified by the labels. This repository may be held internally in the agent or externally from it. The co-ordination engine 210 uses graph descriptions to dynamically build and run co-ordination processes by putting together the process steps identified by the node and arc labels of the graphs.

At agent build time, the user selects from a co-ordination graphs database 310 the specific coordination graphs for the agent, which are loaded into the agent's local coordination graph database 255. (The CABS unique visualiser agent 140 is provided with a control tool which allows users to modify agents' co-ordination graphs at runtime. This is further described below, under the heading "5. DEBUGGING AND VISUALISATION".)

A particularly important feature of the CABS agent is that its co-ordination engine 210 can implement more than one co-ordination process, and therefore more than one coordination protocol, simultaneously. This is done effectively by multiplexing execution of the co-ordination graphs held in the co-ordination graph database 255 by an agent. The engine 210 deals with the first node of each co-ordination graph 255 it has been loaded with, then steps on sequentially to the second nodes of all the graphs, etc. Thus it effectively steps through the co-ordination graphs 255 in parallel.

CABS thus provides in the agent shell 300 a co-ordination engine and reasoning system 210 for which the functionality is determined by selection from a set of co-ordination graphs 310 during agent build. Once each agent is in use, the co-ordination graphs are used by the co-ordination engine and reasoning system 210 to run specified co-ordination process steps and protocols.

The repository of process steps identified by the labels is not necessarily itself held in each agent. It may simply be accessed by the agent at runtime, in accordance with its co-ordination graph(s).

(In the following, the co-ordination engine and reasoning system 210 is also referred to as the Coordination Software Module 210.)

The overall architecture of the Coordination Software Module 210 is one of a Turing state machine. It takes as inputs various state variable values, parameters, goals, exceptions and constraints, and it outputs decisions.

In a multi-agent system, when two or more agents go through a co-ordination process, using their respective Coordination Software Modules 210, the overall process functionality can generally be represented by a "universal co-ordination protocol (UCP)" as follows:

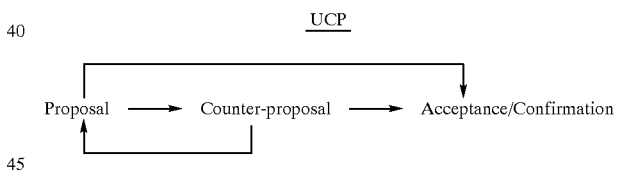

This UCP is a 3-phase sequence of activities "proposal", "counter-proposal" and "acceptance/confirmation", with possible iterations as shown. Each activity is represented by a "node" (represented here by a high level process description) and the nodes are connected by "arcs" (shown here as arrows) which each indicate a transition condition for moving from node to node. The Coordination Software Module 210 for each agent must be capable of supporting that agent's role in the UCP.

2.3.1 Co-ordination Software Module 210

The co-ordination software module 210 is designed to interpret co-ordination graphs when given an initial (problem) state. The initial state specifies the initial conditions of the problems and the necessary data.

Execution of a graph by the coordination software module 210 proceeds as follows: the engine selects the first node of the graph and instantiates a process identified by the label of the node. This process is run by calling its exec( ) which returns one of three possible results: FAIL, OK or WAIT. If exec( ) returns OK, a process identified by the label of the first arc leaving the node is instantiated and executed. If the arc test succeeds then the node pointed to by the arc is scheduled for execution. The graph will be executed in this way until a final node is reached from which there are no more arcs.

The co-ordination software module 210 continuously cycles through graphs in the sense that it monitors for events and exceptions occurring at any time.

If an arc test fails at a node, the next arc from the node is tried. If a node's exec( ) method returns FAIL or all arcs leaving the node fail then the node is backtracked over (by calling the node's backtrack( ) method which undoes any changes made by the exec( ) method) to the previous node of the chain.

If a node's exec( ) method returns WAIT, then the node is placed on a wait queue until one of two conditions become true: either a new external event is received by the engine (e.g. a reply message is received from another agent) or a timeout specified by the node is exceeded. In either case, the node is scheduled for execution again. In summary, the engine performs a depth-first execution of the graph with backtracking allowed.

Other attributes of the engine include:

(i) the ability to treat graphs and arcs as equivalent when an arc label in fact denotes a graph—this gives the engine recursive power; and (ii) the ability to create multiple instances of the same arc and execute them in parallel with management of failure of the parallel branches. I.e. when one branch of a parallel arc fails, the engine automatically fails all the other executing parallel branches.

The detailed logic of the coordination engine 210 is as follows:

Vector executionQueue//queue of nodes awaiting execution

Vector messageQueue//queue of new messages

Vector messageWaitQueue//queue of nodes awaiting messages

```
public void run( ) {
  Node node;
  while(running) {
    node = (Node)dequeue( );
    node.run(this);
  }
}
void enqueue(Node node) {
  add node to the executionQueue
  wake up the engine if it is sleeping
}
Node dequeue( ) {
  Node node;
  Time t;
  while ( executionQueue.isEmpty( )) {
    // compute timeout & wait
    compute the minimum timeout (t) of all the nodes in
    the messageWaitQueue
    t = t - current_time
    // now wait by putting the engine to sleep
    if ( t > 0 ) wait(t);
    check if the timeout of any node on the messageWaitQueue
    has been exceeded. For those nodes whose timeout has been
    exceeded remove them from the messageWaitQueue and add them
    to executionQueue
  }
  delete and return the first element of the execution Queue
}
void add(Node node) {
  enqueue(node);
}
```

-continued

```
void add(Goal goal) {
  select graph (g) from the graph library and run it
}
void add(Message message) {
  if message is a proposal
    create a new goal from the contents of the message and
    run a new graph with the goal as input
  otherwise
    add message to the messageQueue
    wakeup( );
  }
}
void wakeup( ) {
  remove all nodes from the messageWaitQueue and add
  to the executionQueue
}
void waitForMsg(Node node) {
  add node to messageWaitQueue
}
Vector replyReceived(String key) {
  find the set S of all messages in the messageQueue
  with key field = key
  messageQueue = messageQueue - S
  return S
}
```

The following code fragments describe the basic behaviour of a node. Note that in defining a new node only the exec( ) and backtrack( ) functions need to be defined. The other functions below describe how nodes interact with the engine and arcs.

```
String[ ] arcs // the list of arcs from this mode
String[ ] nodes // the list of node pointed to by the arcs
Node    previous_node // the previous node in the chain
Graph   graph // the graph which led to the instantiation of this node
int     state // the current state of this node
int     current_arc // the current arc awaiting execution
Object data // data describing the current state on which this node acts
void run(Engine engine) {
  switch(state) {
    case READY:
      if ( !graph.allow_exec( ) )
      // the graph.allow_exec( )asks the graph if execution of this node
      is allowed
        fail(engine,false,"Exec refused by graph");
      else
        switch( exec( ) ){
          case OK:
            state: = RUNNING;
            engine.add(this);
            break;
          case WAIT:
            engine.waitForMsg(this);
            break;
          case FAIL:
            fail(engine,false,"Node exec failed");
            break;
        }
        break;
    case RUNNING:
      if ( !graph.allow_exec( ) )
        fail(engine,true,"Exec refused by graph");
      else if ( arcs == null )
        done(engine,"terminal node reached");
      else if ( current_arc >= arcs.length )
        fail(engine,true,"All arcs traversed");
      else
        exec_arc(engine, data);
      break;
  }
}
void fail(Engine engine, boolean backtrack, String reason) {
  state = FAILED;
```

```
    if ( backtrack )
        backtrack( );
    graph.failed(engine,this);
    if ( previous_node != null )
        previous_node.nextArc(engine);
}
protected int exec( ) {
    // contains the actual executable code for
    // this node
}
protected void backtrack( ) {
    // reset any state changed by exec( )
}
void exec_arc(Engine engine) {
    load process described by current_arc and
    the call the run( )method of the arc.
    If the run( )method succeeds {
        create a new node process by calling
        graph.newNode(label) where label is the node label pointed to by
        nodes[current_arc ].
        Initialise the new node with setInput(data) and
        add the node to the engine with engine.add(newNode)
    }
    if the arc process cannot be created or the run method
        fails call the nextArc( )method of this node
}
```

```
    void setInput(Object data) {
        this.data = data
    }
    void nextArc(Engine engine) {
        if ( !graph.allow_exec( ) )
            fail(engine,true,"Next arc disallowed by graph");
        else {
            if ( state == DONE && arcs == null )
                fail(engine,true,"All arcs traversed");
            else {
                state = RUNNING;
                current_arc++;
                engine.add(this);
            }
        }
    }
}
```

The following code fragment describes the functions that implement the behaviour of a graph. Note again that a user does not need to implement these functions. To describe any graph, the user simply needs to provide a two dimensional string array listing the nodes and arcs of the graph.

```
    String[ ][ ] nodes // two dimensional array of listing the nodes and arcs of the
graph
    String    start_node // the label of the start node
    String    next_node // the label of the next node
    Node      previous_node // the process of the last node of the graph
    Node      begin_node // the process identifier of the start node    Graph
parent_graph // the graph of which this is a subgraph
    int       state // the current state of the graph
    public void run(Engine engine, Graph parent_graph, Node previous_node,
                    String next_node) {
        this.parent_graph = parent_graph;
        this.previous_node = previous_node;
        this.next_node = next_node;
        start(engine,arc_data);
    }
    public void run(Engine engine, Object input) {
        start(engine,input);
    }
    protected void start(Engine engine, Object input) {
        state = RUNNING;
        begin_node = newNode(start_node);
        if ( begin_node == null )
            fail(engine,"Start node not found");
        else {
            begin_node.setInput(input,previous_node);
            engine.add(begin_node);
        }
    }
    void done(Engine engine, Node node) {
        state = DONE;
        if ( graph != null ) {
            Node next = graph.newNode(next_node);
            if ( next == null) {
            state = RUNNING;
            node.nextArc(engine);
            }
            else {
            Object data = node.getData( );
            next.setInput(data,node);
            engine.add(next);
            }
        }
    }
    void failed(Engine engine, Node node) {
        if (node == begin_node ) state = FAILED;
    }
```

-continued

```
void fail(Engine engine, String reason) {
    state = FAILED;
    if ( previous_node != null )
        previous_node.nextArc(engine);
}
Node newNode(String name) {
    create a new node process identifed by the label name and
    using the 2D nodes array find the arcs leaving this node and
    their destination nodes and set these as the arc/node data
    for the new node
}
```

Below is an example of a graph description which is stored in the coordination graph database 255 and used to create and run a coordination process.

```
{ {"s0",
    "a1", "s1",
    "a2", "s4",
    "a3", "s4"},
  {"s1",
    "a4", "s2",
    "a5", "s3"},
  {"s3"}
  {"s4"}
};
```

The array describes a graph with four states s1–s4, and five arcs a1–a5. From node s0 we can take arc a1 to state s1 or arc a2 to state s4 or alternative arc a3 to state s4. When more than one can be traversed from a node, the arcs are tried in the order in which they are presented in the graph description.

The code with which a user defines a node is simply required to implement an exec( ) and a backtrack( ) method. For arcs the code should implement an exec) method which returns a boolean result of true or false.

2.3.2 Coordination Mechanisms

Figure 11:
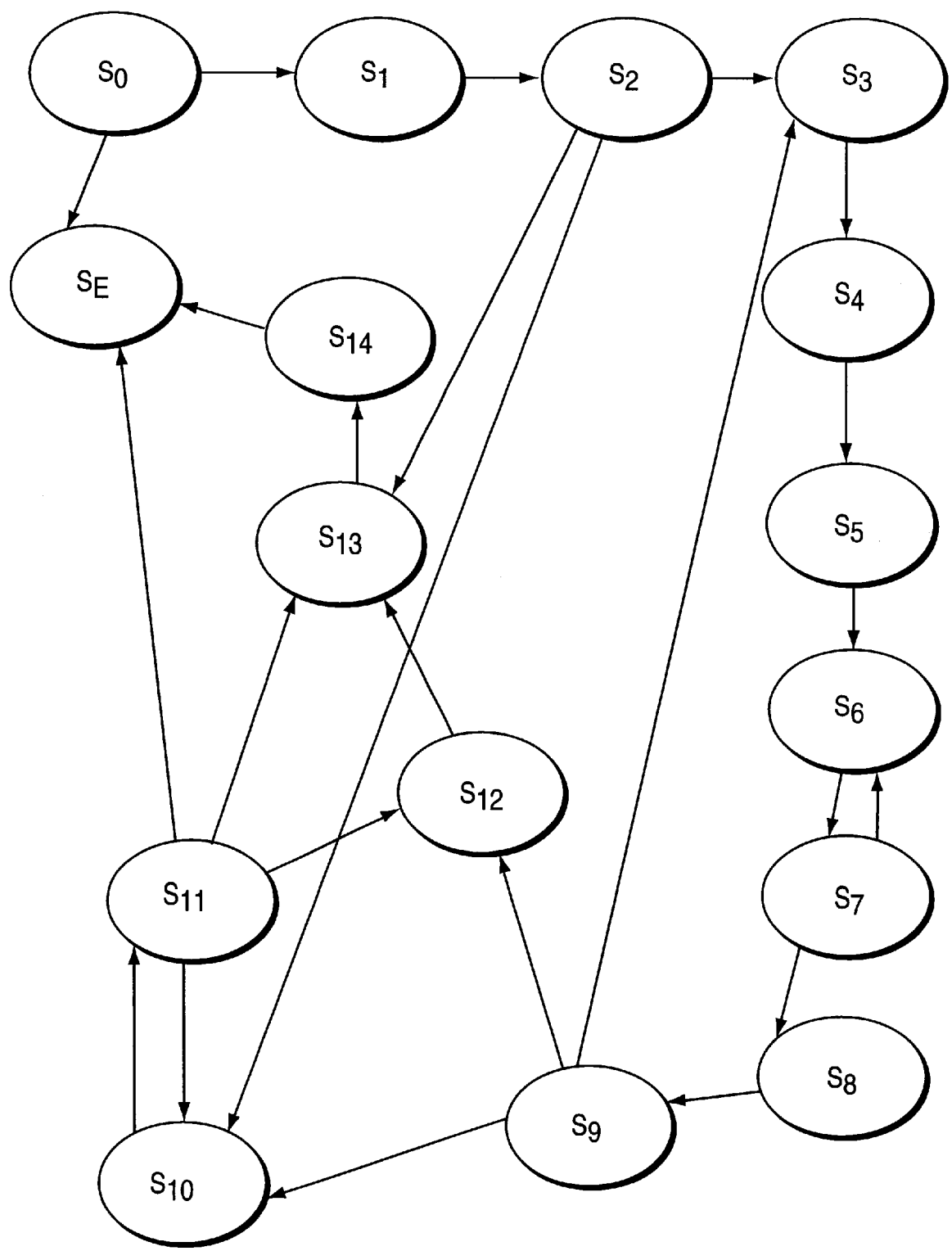
FIG. 11 shows a flow chart of a co-ordination process for use between agents in a system according to FIG. 1.

Referring to FIG. 11, in CABS agents every coordination mechanism is specified in terms of a 14-stage framework where in each stage at least one state process function should be implemented. The 14-stage framework can be considered an "executive summary" of the detailed logic of the co-ordination engine 210 set out in code above. Generic atomic process functions for the fourteen stages are listed below. FIG. 11 describes in schematic form the stages listed below.

Resource Phase

In this phase, an agent A2 has been triggered by an incoming message from another Agent A1 which for instance needs to delegate tasks. The incoming message will be sent to the co-ordination engine and reasoning system 210 of A2 which will call on the planner and scheduler 220, and on the various databases 230, 225, 215, 245 in building and running a co-ordination graph in order to respond to agent A1. In the resource phase, agent A2 will use the task database 230 to see what resources a task requires, and the resource and commitment databases 225, 245 to see if it has those resources available.

Stage One

Verify resource availability and determine actions for situations of sufficient/insufficient resources;

Decision:

if resources are completely/partially sufficient go to next stage;

if resources are completely not available reject and terminate;

Stage Two

Tentatively reserve resources;

Delegation Phase

This phase will only come into play if agent A2 does not have the resource available, itself, to respond to agent A1.

Stage Three

Determine the agent's position/role in the whole coordination context (head—owner of the current goal, or non-head—i.e. one to whom a sub-goal has been delegated) and distinguish the level of resource availability (partially/completely sufficient).

if resources are only partially sufficient go to next stage $(S_2-S_3)$;

if the resources are only partially sufficient, it is necessary to negotiate with other agents to find additional resource. Stages $S_3$ to $S_9$ bring in negotiation process steps which are not required if resources are completely sufficient. Hence, if resources are completely sufficient and the agent's role is "head" go to Stage Thirteen $(S_2-S_{13})$;

resources are completely sufficient but the agent's role is not "head", go to Stage Ten $(S_2-S_{10})$;

Stage Four

Find the first set of tasks whose required resources cannot be met;

Remove the selected set $(S_3-S_4)$;

Stage Five

Create a new proposal using every task in the selected set $(S_4-S_5)$;

Stage Six

Find a set of agents to which the proposal can be posted $(S_5-S_6)$;

Negotiation Phase

Stage Seven (will depend on co-ordination strategy to be applied, for instance "Multiple Round Second Price Open Bid" or "Contract Net"—see below.)

send the proposal $(S_6-S_7)$;

perform acceptance handling $(S_7-S_6)$;

(perform counter-proposal handling) $(S_6-S_7)$;

(perform modified-proposal processing) $(S_7-S_6)$;

Stage Eight

Summarise results obtained from negotiation phase $(S_7-S_8)$;

Stage Nine

Decision: select a set of acceptances from the result $(S_8-S_9)$;

Stage Ten

Decision:

if there are other sets of tasks whose required resources cannot be met go to Stage Three ($S_9$–$S_3$);

if there are no other sets of tasks whose required resources cannot be met, and the agent is a head agent go to Stage Thirteen ($S_9$–$S_{12}$);

if there are no other sets of tasks whose required resources cannot be met, and the agent is not a head agent go to next stage ($S_9$–$S_{10}$);

Stage Eleven
  send acceptance and replies ($S_{10}$–$S_{11}$);
  perform confirmation handling ($S_2$–$S_{10}$);
  if applicable, perform modified-proposal handling ($S_{11}$–$S_{10}$);

Stage Twelve
  Decision:
  if not having delegated and confirmation received go to Stage Fourteen ($S_{11}$–$S_{13}$);
  if having delegated and confirmation received go to next stage ($S_{11}$–$S_{12}$);
  if no confirmation received reject and terminate ($S_{11}$–$S_E$);

Stage Thirteen
  Send confirmation ($S_{12}$–$S_{13}$);

Stage Fourteen
  Firmly reserve the resources and terminate ($S_{13}$–$S_{14}$, $S_{14}$–$S_E$);

2.3.3 Defining New Coordination Mechanisms

The design of the coordination machine allows virtually infinite extension to the various UCP-compliant coordination graphs and even to non-UCP-compliant graphs. This is achieved by the fact that the coordination engine is a generic and domain-independent function which interprets any graph description of the form described earlier. By giving different coordination graphs to the engine, different coordination behaviour will be performed. Moreover, by altering the implemented functions (i.e. programs) identified by the node and arc labels of a graph, then on executing that graph the engine will behave differently even if the set of given labels remains unchanged.

It has been realised that the UCP and its derivative, the 14-stages framework, subsume many existing coordination mechanisms. It has also been realised that these mechanisms differ only in certain minor, but subtle, aspects. After careful analysis, it was found that by differentiating the UCP in 14 stages, most mechanisms have many of the stages in common and only differ in a small number of stages. This makes it possible to implement a large number of different mechanisms by developing only a few new functions and many of the common functions can be reused. In addition, specifying mechanisms using a unified underlying framework makes it possible to solve a problem using a mixture off different mechanisms.

Given a coordination behaviour, in order to define a new UCP-compliant coordination graph, the following steps should suffice:

To refine the behaviour so that the decision-making and processing conform to the 14-stages framework;

Search the library of the coordination machine, and reuse existing implemented functions as far as possible. This will be where the functional behaviour is identical to the required one;

For those stages where no implemented functions can be reused, implement new functions in which the following three methods must exist:

exec: to verify whether function is applicable, perform the necessary change of state, messaging, and certain databases update;

backtrack: to reset all the operations performed and restore the original state;

Label: give any newly implemented function a label.

2.3.4 Adding New Coordination Graphs to the Engine

After a repository of implemented functions has been defined, in order to allow the engine to use a particular coordination graph, a string description of the graph should simply be added to the engine. (The engine can unify multiple coordination graphs into one unified graph which contains no duplication of states.)

If more than one coordination mechanism is required to solve a particular problem, the engine should in this case be given the graphs describing the required coordination processes. Following unification of the graphs, the engine is able to apply the different mechanisms implicit in the unified graphs opportunistically.

2.4 Acquaintance Database 215

The resource, task, and acquaintance databases 225, 230, 215 primarily serve as information repositories, and can be implemented using conventional database technologies which support storage, retrieval and query facilities. In one implementation, a hashtable (linking each data item to be stored with a unique key) is used as the main data storage structure for each module.

The acquaintance database 215 stores an acquaintance model for the agent in the form of a relationship table as in the following example: the domain in this example is a dealing environment such as between two shops: Shop 1 and Shop 2. Referring to FIG. 6, the manager agent of Shop 1 (Agent A1) has two assistants, Agents B1 and C1; whilst the manager agent of Shop 2 (Agent A2) has three assistants Agents B2, C2 and D2.

Necessarily in this scenario, A1 knows of the existence and abilities of B1 and C1 since they are his assistants, and similarly A2 of B2, C2 and D2. Assume that A1 knows of A2 and the items A2 can produce; however A2 has no knowledge of A1. Further, assume that in each shop, the assistants all know one another and their respective abilities. The two tables below summarise one possible instance of the organisational knowledge of the agents in Shops 1 and 2.

TABLE

An instance of the organisational knowledge of Shop 1 agents

| Base Agent | Relation | Target Agent | Abilities Base believes Target possesses |
|---|---|---|---|
| A1 | superior | B1 | (:item Item1 :time 4 :cost 5), . . . |
|  | superior | C1 | (:item Item2 :time 3 :cost 4), . . . |
|  | peer | A2 | (:item item3 :time 5 :cost 8), . . . |
| B1 | subordinate | A1 |  |
|  | co-worker | C1 | (:item Item2 :time 5 :cost 3), . . . |
| C1 | subordinate | A1 |  |
|  | co-worker | B1 | (:item Item1 :time 4 :cost 5), . . . |

TABLE

An instance of the organisational knowledge of Shop 2 agents

| Base Agent | Relation | Target Agent | Abilities Base believes Target possesses |
|---|---|---|---|
| A2 | superior | B2 | (:item Item4 :time 2 :cost 5), . . . |
|  | superior | C2 | (:item Item5 :time 3 :cost 3), . . . |
|  | superior | D2 | (:item Item6 :time 6 :cost 7), . . . |

TABLE-continued

An instance of the organisational knowledge of Shop 2 agents

| Base Agent | Relation | Target Agent | Abilities Base believes Target possesses |
|---|---|---|---|
| B2 | subordinate | A2 | |
| | co-worker | C2 | (:item Item2 :time 5 :cost 3), . . . |
| | co-worker | D2 | (:item Item6 :time 6 :cost 9), . . . |
| C2 | subordinate | A2 | |
| | co-worker | B2 | (:item Item1 :time 4 :cost 5), . . . |
| | co-worker | D2 | (:item Item6 :time 6 :cost 9), . . . |
| D2 | subordinate | A2 | |
| | co-worker | B2 | (:item Item1 :time 4 :cost 5), . . . |
| | co-worker | C2 | (:item Item2 :time 5 :cost 3), . . . |

The Shop 1 Table introduces the four organisational relationships used in the current implementation of the CABS system. The superior and subordinate relationships maintain their natural interpretation as vertical structural relationships with authority undertones. Peer and co-worker are horizontal structural relationships; in CABS, a co-worker is another agent in the same static agency who is neither a superior nor a subordinate. Peer relationships are the default, and refer to any agent known by the base agent who is neither a superior, subordinate nor co-worker.

Some of the implications of the different organisational relationships on negotiation and coordination strategies are discussed below, under the heading

"4.4 Step 4: Agent Coordination Strategy Specification 510"

Note that organisational relationships are not by default bi-directional. That is, although an agent X might believe Y to be her subordinate, it does not necessarily imply that Y believes X to be her superior. It can also be noted that the Shop 2 Table shows no peer relationship for the A2 agent. This reflects the fact that the A2 agent has no knowledge of the manager of Shop 1, the A1 agent.

Note also that one agent's beliefs about a second need not be consistent with a third agent's beliefs (data) about the second. For example, in the Shop 1 Table, A1 believes C1 can produce Item2 at a cost of 4 units and using 3 time units. However, B1 believes differently that C1 produces Item2 at cost 3 units and using 5 time units. This may in practice arise if agents have different service level agreements, for instance.

2.5 Planner & Scheduler 220

The role of the planner/scheduler is to plan and schedule the tasks to be performed by the agent. Conventional planning (e.g. means-end analysis as in the SIPE or O-PLAN planners—see papers in IEEE Expert: "Intelligent systems ano their applications", Vol 11, No. 6, December 1996), and scheduling (e.g. job-shop scheduling) techniques can be used. However, the planner and scheduler 220 of the CABS agent has additional, innovative aspects. For instance it can offer an overbooking facility to ensure maximised use of resource.

The implementation of a CABS agent's planner/scheduler 220 is a means-end partial and hierarchical planner. Referring also to FIG. 9, it maintains a commitment table (or database) 245 which is a two-dimensional array with rows 900 denoting available processors and columns 905 denoting time points (using an integer representation of time). The base time ("0") of the table is the current time, while the maximum time is the current time plus the maximum plan-ahead period of the agent.

Inputs to the planner/scheduler 220 are goals of the form: Produce resource R, by time e, at maximum cost c. Note, the goal specification may include other parameters such as quality. This will depend on the planner being used. Its outputs are:

(a) output-tasks—a set of tasks it will need to perform to achieve the goal; and (b) output-subgoals—a set of sub-goals which the agent must contract out to other agents if the top-level goal is to be achieved.

The behaviour of the planner is as follows:

if (e<current-time or e>current-time+plan-ahead) return fail.

/* Check to ensure we are within the time-range covered by the agents planner */

Let applicable-tasks=the set of tasks in the agent's task database which have the desired resource R as one of their effects (produced items).

/* Note depending on the planner the applicable-tasks can be ordered by cost, quality, time, etc. That is, the cost of performing the task, the quality of resources the task produces, or the time it takes to perform the task.* /

For each task in the set of applicable-tasks do

Attempt to place the task in the commitment table in a continuous block of free spaces, between the desired end-time e of the task and the current-time.

If not enough free spaces are available for the task, go on to the next task in the set of applicable-tasks.

If task has been successfully placed on the table:

Add task to the set output-tasks the start-time s of the task is given by its start position on the table Let consumed-resources=the set of resources required to perform the task.

For each resource C in consumed-resources:

Check the resource database for C if the resource database contains C then allocate C to the task; otherwise create a subgoal to achieve resource C by time s, and with other constraints such as quality similar to those imposed on the top-level goal.

Next, recursively invoke the planner to achieve the new subgoal C, and append the two outputs of the planner respectively to the sets output-tasks and output-subgoals.

If the no task can be found to achieve the resource R within the time, resource and other constraints, append the goal to achieve R to the set output-subgoals and return.

The computation of the total cost of achieving a goal is taken as the sum of the cost of performing all the task required to attain the goal.

Once planning has taken place, the planner tentatively books the planned schedule into the commitment table. On receipt of a confirmation of the booking from the coordination engine, the schedule will be firmly booked and the tasks made ready for execution at their scheduled times. This use of tentative and firm booking gives the coordination engine time to delegate external subgoals required to achieve a goal, and also the ability to cancel commitments.

The behaviour of the CABS agent planner introduces the following particularly useful concepts:

the use of tentative and firm bookings gives the planner the ability to double-book already tentatively booked slots (similar in principle to what airline reservation companies do). This idea improves the agent's chances of operating at full capacity. The mechanism for handling double-booking operates as follows: The planner maintains a second copy of the commitment table which records only the firmly booked slots and double-booked tentatively booked slots. If double-booking is allowed by the agent, the planner uses this table in planning when it cannot find free slots for a task using the normal commitment table. If free slots are found on the second table, then those slots are marked as double-booked. In the current implementation, when two goals are booked on the same slots, the first goal to be confirmed gets allocated the slots and the second goal is rejected. Other selection policies could be implemented, e.g. highest priority goal or highest cost goal, etc. It is also possible to control the degree of double-booking by giving the planner a percentage of its total number of slots that can be double-booked.

bounding the maximum number of parallel branches on the basis of available processors;

the preconditions of a task may be ordered, e.g. a task with three preconditions A, B and C might impose the constraint that A must be achieved before B, then C. While this is a feature of some conventional planners, in CABS such goal ordering leads to the interleaving of planning with coordination. In conventional agent-based systems the coordination engine controls the planner but in CABS agents the planner 220 and the coordination engine 210 share control when handling goal ordering. For example, in the A, B, C case above, A might be planned for by the agent and B sub-contracted out. However, the choice of agent to achieve B and the manner in which it will be achieved (variable bindings), and the way in which A will be achieved will all affect C. Thus, the ultimate decision about which agent gets the contract depends on the planner and is not simply based on a single factor such as cheapest cost. Such problems typically occur when sub-goals are not independent; and interleaving planning with coordination provides a flexible mechanism for handling such dependence.

Reference is made above to "variable bindings". These are a known concept for enforcing an equality constraint between a variable and a fact or another variable. A binding is used when a variable is set equal to a fact. For example, if variable "v1" equals fact "f1", say, "v1" is said to be bound to "f1".

CABS agents can also allow an optimising scheduler to be attached to the commitment table. In a simple implementation, a constraint satisfaction algorithm can be used to reschedule already planned activities such that none of the constraints that were imposed during planning is violated. This is useful in handling exception or in achieving policy goals. Optimisation can be added to the constraint-based rescheduler.

In the case of exceptions, an exception (unexpected failure condition) might occur when an executing task overruns its scheduled time. If there are free slots in the commitment table, then the planner could possibly reschedule its activities to give the executing task more time. For a simple constraint satisfaction type rescheduling, the planner tries to arrive at a new arrangement such that none of the original constraints imposed by the goals are violated. For an optimising rescheduler, the planner might allow constraint violation so long as an optimal arrangement is found (optimality in this case will be based on criteria decided on by the developer). For example a low cost job to which the planner is already committed may be dropped in favour of extending the processing time of an over-run high cost job.

A scheduler might also be used to ensure policy objectives. For example, an agent might have a policy objective to ensure that jobs are performed as quickly as possible. In such a case, in the commitment table 245 shown in FIG. 9, it may shift sub-tasks B and C two and one cell leftwards respectively and begin executing them if the agent has all their required resources—such rescheduling does not violate any of the constraints imposed by the top-level goal.

2.6 Resource Database 225

The resource database 225 stores resource definitions.

In general, a "variable" is a logical description of something while a "fact" is a specific instance of that something, with relevant data added to the logical description. Resources in this context are facts which therefore require the user to provide data in relation to each resource for the purpose of building the commitment table. The FactNariables Editor 355 is provided so as to allow the user to load the necessary data using a frame-based object-attribute-value formalism.

A resource is defined as an object with attached attribute-value pairs. For example, an agent in a communications system may require a resource in order to provide a fibre-optic network connection from London to Ipswich which transmits video data. The resource need of the agent can be expressed as follows:

RESOURCE EXAMPLE 1

```
(:type network-link
 :is-variable false
 :id 11001
 :attributes (:from London
              :to Ipswich
              :connection-type fibre-optic
              :speed 1000
              :data-type video
              }
}
```

The particular resources and associated attributes chosen will depend on how the user decides to model the domain.

If the "is-variable" flag is false as in the example above, then the resource is indeed a fact. Otherwise it is considered a variable. The "id" field gives the unique identifier of the resource. The following two examples are of resource variables:

RESOURCE EXAMPLE 2

```
(:type video-data
 :is-variable true
 :id 11002
 :attributes (:data XXX
              }
}
(:type video-data-transmitted
 :is-variable true
 :id 11003
 :attributes (:from ?location1
              :to ?location2
              :data ?any-data
              }
}
```

Note that "?anything" denotes a local variable.

The resource database 225 also contains the ontology database 260. This stores the logical definition of each fact type—its legal attributes, the range of legal values for each attribute, any constraints between attribute values, and any relationships between the attributes of the fact and other facts. Agents have to use the same ontological information if they are to understand each other.

2.7 Task Database 230

The task database stores task definitions that will be used for instance by the planner and scheduler 220.

The task definition provides a skeletal programming framework which comprises:

a sequence of activities selection (if, then . . . )

iteration (exit condition)

The CABS task definition (or description) also introduces the idea of "mandatory parallel" tasks and "optional parallel" tasks. Where a task description shows mandatory parallel activities, more than one activity has to be carried out simultaneously. This will prevent an agent with only a single resource available from contending for the task.

A task may be a primitive task, comprising only one activity, or may involve a set of sub-tasks. An example of the latter is where the task is to carry out a simple arithmetic calculation such as "$ax^2+dx+c$." If this task is shown with the mandatory parallel indication, then the three values $ax^2$, $dx$ and $c$ will be calculated simultaneously, followed by the sequential step of adding the calculated values together. For a task of this nature, a decomposition 560 will be generated by the task definition editor 335 (see below under the heading "4.5 Step 5: Tasks Definition") and an important aspect of the task description will be the interfaces between outputs of one task activity to inputs of subsequent task activities.

A task description further comprises pre-conditions for the task, such as, resources it will require and the effects it will have (inputs/outputs), how long the task will take, logical descriptions for actually performing a task at the external system 125 and, in the case of complex tasks, the decomposition 560 mentioned above which is a list of sub-tasks within the complex task.

An output of the task is a callback 555, this being the instruction which is output via the execution monitor 250 to the external system 125 to perform a relevant function. An example might be to run a facsimile activity. The logical description comprises a variable 550 which describes loading paper and dialling a facsimile network number. A decomposition 560 for the task would list sub-tasks such as detecting presence of the master sheet to be sent, or of a block of text data in the correct buffer, detecting ring tone, detecting call pick up and commencing transmission, or detecting busy tone, storing the required number and retrying after a set time interval. (These are clearly sub-tasks which could not be done in parallel or divided amongst facsimile machines.) The callback 555 is the instruction to a facsimile machine in the real world to carry out the actual facsimile activity.

Tasks and task definitions are discussed in more detail below (under the heading "4.5 Step 5: Tasks Definition").

2.8 Execution Monitor 250

The execution monitor 250 has interfaces to the external system 125, to the planner and scheduler 220 and to the co-ordination engine and reasoning system 210.

The execution monitor 250 achieves an agent's goals by causing tasks to be performed in the external system 125. For every task type in the CABS environment, a user-defined task call-back function is provided. When the execution monitor 250 decides to execute a particular task, it does so by calling the appropriate task call-back functions and outputting them to the external system 125.

To simplify the construction of CABS, the actual execution in these task call-back functions is simulated. On successful completion of a task, the execution monitor 250 will be signalled. Nonetheless, failure of task execution (e.g. there may have been a hardware problem in robot arms of the external system 125) can also be simulated. In these circumstances, the execution monitor 250 will be alerted of the failure and hence appropriate corrective actions can be designed. For instance, the agent designer may design the agent, upon failure, to re-schedule the goals to be achieved by running alternate task call-back functions or by delegating them to other agents through the coordination engine 210.

Furthermore, the execution monitor 250 can decide that the time required to execute a task has exceeded its expected duration, the execution monitor 250 not having received an appropriate input signal. By the same token, the agent designer can determine what appropriate actions should be carried out in such a case.

The execution monitor 250 has the following functions for proposals labelled by PID and Seq:

Book (reserves resources)

Book [PID, Level, Seq, AID]

where

PID, Proposal-ID, labels a particular proposal;

Level, Seq $\in$ Z is the level number and sequence number of proposal.

AID specifies the ID of the action returned by the function.

UnBook (cancels the reservation of resources)

UnBook [PID, Level, Seq, AID]

where

PID, Proposal-ID, labels a particular proposal;

Level, Seq$\in$Z is the level number and sequence number of proposal.

AID specifies the ID of the action returned by the function.

Commit (allocates resources)

Commit [PID, Level, Seq, AID]

where

PID, Proposal-ID, labels a particular proposal;

Level, Seq$\in$Z is the level number and sequence number of proposal.

AID specifies the ID of the action returned by the function.

Uncommit (cancels the allocation of resources)

Free [PID, Level, Seq, AID]

where

PID, Proposal-ID, labels a particular proposal;

Level, Seq$\in$Z is the level number and sequence number of proposal.

AID specifies the ID of the action returned by the function.

(This function can only be executed only if the execution of the proposal has not yet commenced.)

3. OVERVIEW: CABS PLATFORM

Referring to FIG. 3, the means for capturing data for loading said architecture , for generating a system comprising one or multiple entities according to said architecture, and for automatically building a software module according to said architecture, is provided by the CABS platform. This provides an agent template 300 which dictates the agent structure shown in FIG. 2, a user interface 305 which is primarily a set of editors for identifying a set of agents, selecting agent functionality and inputting task and domain-related data, a library of co-ordination strategies 310 and a set of standard-type, supporting agents 315.

The agent shell 300 is simply the framework to support an agent structure as shown in FIG. 2 and described in full herein. The editors are described below. The co-ordination strategies 310 are described above, under the heading "2.3 Co-ordination Engine and Reasoning System 210". One of the supporting agents 315 is particularly important however, and novel. This is described below, under the heading "5. DEBUGGING AND VISUALISATION". It could have application in other multi-agent and distributed systems, not just those built using the CABS system.

The editors of the user interface 305 support and record decisions taken by the developer during agent creation and input via a design interface 350. In more detail, they comprise the following:

an agent definition editor 320 (referred to below under "4.2 Step 2: Agent Definition 500") for providing a logical description of the agent, its abilities and initial resources etc an organisation editor 325 (referred to below under "4.3 Step 3: Agent Organisation 505") for describing the relational links between agents in a scenario and also the beliefs that each agent has about other agents in the system a co-ordination editor 330 (referred to below under "4.4 Step 4: Agent Co-ordination Strategy Specification 510") for selecting and/or describing co-ordination strategies of the agents a task description editor 335 (referred to below under "4.5 Step 5: Tasks Definition 520") for describing the tasks that the agents in the domain can perform an ontology editor 340 (referred to below under "4.1 Step 1: Domain Study and Agent Identification 515") for describing a suitable ontology for the domain a fact/variable editor 355 (referred to below under "4.2 Step 2: Agent Definition 500" and under "4.5 Step 5: Tasks Definition 520") for describing specific instances of facts and variables, using the templates provided by the ontology editor 340 a code generation editor 360 (referred to below under "4.6 Step 6: Domain-specific Problem Solving Code Production 525") for generating code according to the definitions provided for each agent a summary task editor 365 (referred to below under "4.5 Step 5: Tasks Definition 520") for describing summary tasks which are tasks composed of one or more sub-tasks which have to be performed in some order a constraints editor 370 (referred to below under "4.5 Step 5: Tasks Definition 520") for describing the constraints between (i) the preconditions and effects of a task, (ii) one or more preconditions of a task, and (iii) the effects of a preceding task and the preconditions of a succeeding task in a summary task description.

The output 100 of the CABS platform is then a logical description of a set of agents and a set of tasks to be carried out in a domain, together with executable code for each agent and stubs for executable code for each task.

CABS embodies a system of methods plus environment to provide a multi-agent systems developer with the means to:

configure a number of different agents of varying functionality and behaviour, organise them in whatever manner she chooses, imbue each agent with communicative and co-ordination abilities selected from a CABS-supplied list, supply each agent with the necessary domain-specific problem-solving code, and automatically generate the required executables for the agents.

In addition, the CABS platform can provide the developer with a suite of support agents 315 of known general type such as name-servers, facilitators (classified directories), and visualisers. Overall, CABS allows the system developer to concentrate on domain-specific analysis without having to expend effort on agent-related issues.

4. USING CABS PLATFORM TO DESIGN AN AGENT SYSTEM

Figure 4:
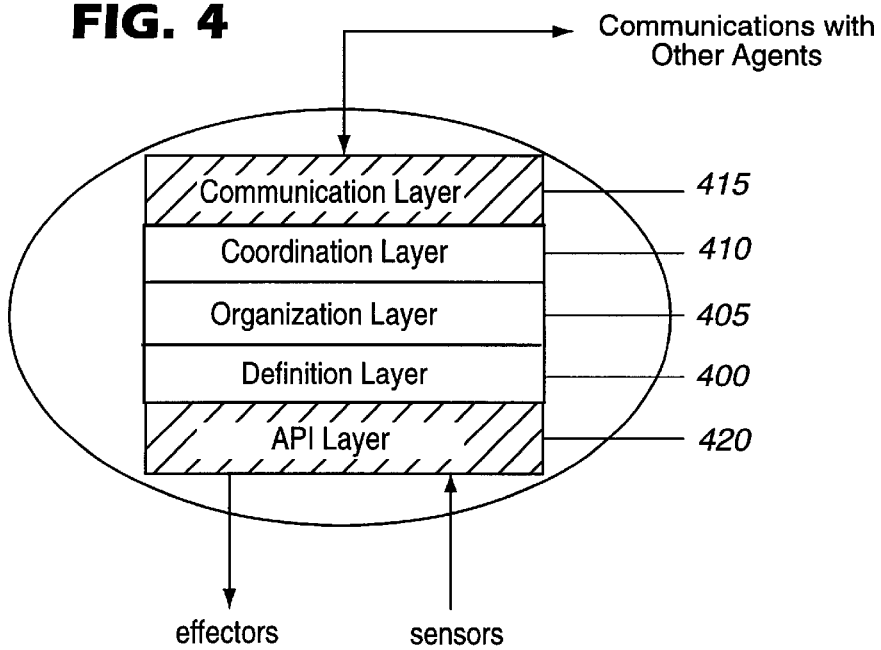
FIG. 4 shows a layered model of an agent in terms of primary characterisation.
Figure 5:
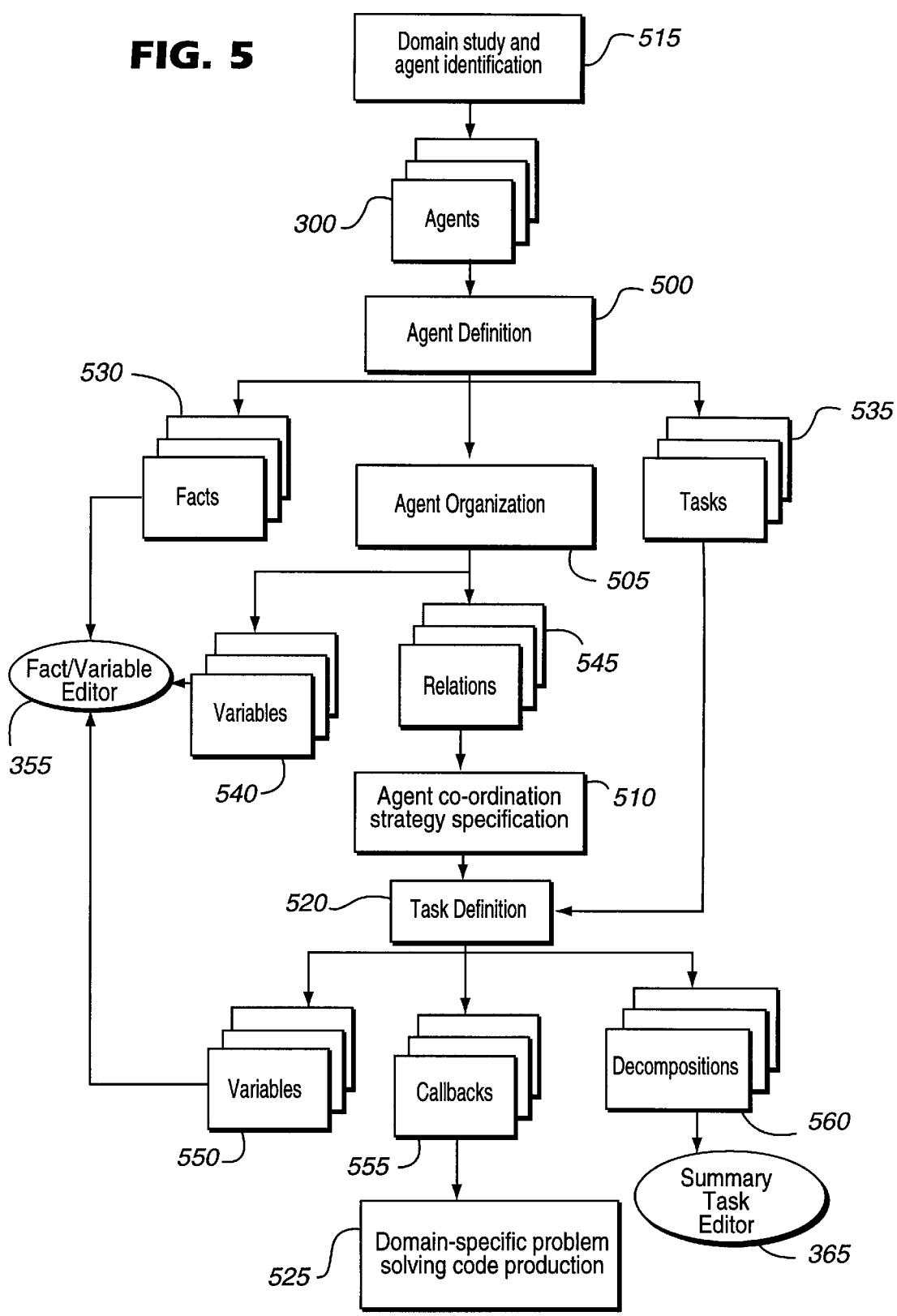
FIG. 5 shows a flow chart of steps involved in designing an agent using the platform of FIG. 3.

The CABS platform is based on a methodology for designing collaborative software agents which views the agents as having five primary sets of characteristics, or "layers". Referring to FIGS. 4 and 5, this methodology requires developers to provide inputs in respect of three of these, a definition layer 400, an organisation layer 405 and a coordination layer 410, as follows.

In an "agent definition" step 500, relevant to the definition layer 400, user inputs determine the agent in terms of its reasoning (and learning) abilities, goals, resources etc.

In an "agent organisation" step 505, relevant to the organisation layer 405, user inputs determine the agent in terms of its relationships with other agents, e.g. what agencies it belongs to, what roles it plays in these agencies, what other agents it is aware of, what abilities it knows those other agents possess, etc. (An agency is a group of agents which share a common attribute such as belonging to the same company. Agencies may be virtual or real. A, virtual agency is a group of agents which share some sort of co-operation agreement.)

In an "agent co-ordination" step 510, relevant to the coordination layer 410, user inputs determine the coordination and negotiation techniques for the agent.

The two other "layers" which will be present in each agent are shown in FIG. 4. They are a communication layer 415, which handles technical aspects of inter-agent communication, and an application programming interface (API) layer 420 which provides an interface for external systems to add, modify or delete resources available to the agent. In the structure shown in FIG. 2, the communication layer 415 will be provided by the mailbox 200 and the message handler 205. The API layer 420 will be provided by the interfaces between external systems 240 and the resource database 225 and the execution monitor 235. These are therefore both provided by the agent template 300 of FIG. 3.

The user inputs required by the CABS methodology to the definition layer 400, the organisation layer 405 and the coordination layer 410 are structured according to the following six steps:

1. Domain study and agent identification 515,
2. Agent definition 500,
3. Agent(s) organisation 505,
4. Agent coordination strategy specification 510,
5. Tasks definition 520, and 6. Domain-specific problem solving code production 525.

Referring to FIGS. 3 and 5, the CABS platform provides visual programming editors via the user interface 305 to support and automate Steps 1–5. These steps should be performed iteratively until the developer is satisfied that the final suite of agents accurately depict the problem being modelled.

Use of the CABS platform to carry out Steps 1–6 is now described in more detail.

4.1 Step 1: Domain Study and Agent Identification 515

The CABS platform is for use by a developer who is the domain expert rather than a software agent expert. This first step will be carried out in a way that the domain expert considers best. It might be that the domain expert for instance bases a decision on where control processes have to be carried out in the domain. However, the preferred approach is to emphasise autonomous decision-making ability as the main criterion for identifying the initial set of candidates for agents in the domain. The level of granularity at which the domain is modelled will be determined by the domain expert and will determine the boundaries of the candidate agents. As a starting point, candidate agents will usually be identified wherever there is a decision-making entity in the domain.

The user input at this stage will simply be a list of agent identifiers, representing the set of candidate agents selected by the domain expert as likely to provide a reasonable model of, and therefore workable control structure for, the domain. The CABS system will allocate each of the identifiers a copy of the agent shell 300 and the output of Step 1 is this set of agent shells 300.

If at a later stage it is found that there is conflict, for instance a candidate agent having to be allocated decisions in respect of a process it cannot influence in practice, then the list of agent identifiers can be amended to adjust the set of candidate agents, for instance to introduce a new one, and the design process will be reiterated to reflect the changes.

No specific editor is necessary for agent identification.

Another important user input is the vocabulary of the domain. This is input using the ontology editor 340. An ontology or data dictionary for a domain describes all the possible concepts or objects that can exist in the domain. In CABS, an object-attribute-value formalism is used for describing domain objects and concepts. The ontology editor 340 simply provides templates for describing these objects, that is (i) the different object types, (ii) the list of attributes of each of these object types, (iii) the type of values that each attribute takes, and (iv) the default values (if any) for each attribute. This editor provides a template or form so that you can describe the vocabulary of the domain which the agents will be controlling.

The ontology editor 340 allows the user to identify an ENTITY, its ATTRIBUTES, the VALUES the attributes take, and typical DEFAULT values. An example in the communications network field would be as follows:

| ENTITY ATTRIBUTES | Link type | capacity |
|---|---|---|
| VALUE | video, satellite, optical, etc | 10 Mbits/s |
| DEFAULT VALUE | | 7 Mbits/s |

4.2 Step 2: Agent Definition 500

For each of the agents identified in Step 1, the following user inputs have to be made, via the Agent Definition Editor 320:

- identities of the tasks the agent can perform;
- the number of tasks the agent can perform concurrently;
- the time period over which the agent will normally allocate its resources (plan its activities); and
- the resources available to the agent.

This data will be routed to the planner and scheduler 220, described above in relation to FIG. 2, for use in building a commitment table 245.

Data entry concerning task identifiers, the number of tasks and the planning time frame is a fairly straight forward process, except that where the time frame is concerned, different factors will come into play. For instance, in some scenarios, an agent which can only plan ahead for shorter durations is less able to meet customer requests but may be more reactive to changing economic, circumstances.

The tasks are defined at a later stage, discussed below under the heading "4.5 Step 5: Tasks Definition", and at this stage it is only necessary to input the identifiers. However, the resources available to the agent have to be defined. Since the context in which the agent may be functioning could be any of a large number of very different contexts, it is necessary to give the agent a definition of the resources which is sufficient for it to build a correct logical model of the real physical resources available to the agent such that it could plan its activities properly. CABS provides a Fact/Variables Editor 355 which is used for describing the resources available to an agent.

In general, a "variable" is a logical description of something while a "fact" is a specific instance of that something, with relevant data added to the logical description. Resources in this context are facts which therefore require the user to provide data in relation to each resource for the purpose of building the logical model of real physical resources. The Fact/Variables Editor 355 is provided so as to allow the user to load the necessary data using a frame-based object-attribute-value formalism.

A resource (or fact) is defined as an object with attached attribute-value pairs. For example, an agent in a communications system may require a resource in order to provide a fibre-optic network connection from London to Ipswich which transmits video data. The resource need of the agent possibly can be expressed as follows:

RESOURCE EXAMPLE 1

```
{:type network-link
 :is-variable false
 :id 11001
 :attributes (:from London
             :to Ipswich
             :connection-type fibre-optic
```

-continued

```
        :speed 1000
        :data-type video
        }
}
```

The particular resources and associated attributes chosen will depend con how the user decides to model the domain.

If the "is-variable" flag is false as in the example above, then the resource is indeed a fact. Otherwise it is considered a variable. The "id" field gives the unique identifier of the resource. The following two examples are of resource variables:

RESOURCE EXAMPLE 2

```
{:type video-data
    :is-variable true
    :id 11002
    :attributes (:data XXX
        }
}
(:type video-data-transmitted
    :is-variable true
    :id 11003
    :attributes (:from ?location1
        :to ?location2
        :data ?any-data
        }
}
```

Note that "?anything" denotes a local variable.

Referring to FIG. 2, the Fact/Variables Editor 355 loads the resource data to the resource database 225 of the agent, to which the planner and scheduler 220 has access for the purpose of building and running a commitment table.

The output of Step 2 is therefore a set of facts 530 (resources) and a list of task identifiers 535 for which definitions must be provided at Step 5, described below.

4.3 Step 3: Agent Organisation 505

For each of the agents identified in Step 1, the following user inputs have to be made, via the Organisation Editor 325:

identify the other agents in the community that it knows;

determine the primary structural relationship it has with each of the identified agents;

identify the task outputs (if any) that each of the identified agents can produce;

specify average cost and time (if known) for each of the identified task outputs.

The data inputs concerning task outputs again need only comprise identifiers for task outputs which can be understood by the agent from the tasks definition, Step 5, described below.

The Organisation Editor 325 uses the data input in this step (Step 3) to create a relationship table which is then stored in the Acquaintance Model 215 of the agent. (The relationship table is described above under the heading "2.4 Acquaintance Database 215".)

The outputs of Step 3 are therefore a set of agent relationships 545 which the CABS system stores in the acquaintance model 215 of the agent, and a set of variables 540 describing the resources (products) that the base agent believes the target agent can produce.

4.4 Step 4: Agent Coordination Strategy Specification 510

For each of the agents identified in Step 1 above, the identities of the UCP-compliant coordination graphs which the agent can execute to realise its different coordination strategies have to be input, via the Co-ordination Editor 330. CABS currently provides the following coordination graphs in its coordination graph database 310 which user can select and assign to agents by loading the agent's coordination graph database 255:

1. Master-slave (hierarchical task distribution)
2. Contract net (Limited contract net)
3. Multiple Round First Price Sealed Bid
4. Multiple Round First Price Open Bid (similar to English Auction)
5. Multiple Round Second Price Sealed Bid
6. Multiple Round Second Price Open Bid (similar to Vickery Auction)
7. Multiple Round Reverse Price Open Bid (similar to Dutch Auction)
8. Single Round Derivatives of the last five strategies Client-server or master-slave coordination occurs when a master assigns a slave a job to perform. This strategy necessarily requires a superior relationship between the slave and master. The contract-net strategy is when an agent announces a task, requesting bids to perform the task from other agents. It then evaluates the bids and awards the contract to the winning agent(s). This strategy does not rely on any organisational relationship between the participating agents. Limited contract-net is similar to the contract-net strategy except that the announcer selects/restricts the agents to whom bids are broadcast.

The coordination protocols listed above can be single round or multiple round. A single round behaviour between two agents involves some agent receiving some proposal (for example) and accepting it immediately. Alternatively, the agent may initiate another round of the cycle in which case a multiple round behaviour emerges. The key point here is that the terminating condition on the agent that initiates the interaction must be met before the interaction terminates.

Typically, most other agent applications have agents with one or at most two fixed strategies. CABS agents can have many more as illustrated by the list above. Hence for example, an agent may use a first coordination protocol (say the English Auction) to sell some antique while simultaneously using a second protocol (e.g. Dutch Auction) for selling flowers, whilst at the same time using a third protocol (the contract net) for some other tasks distribution.

If a user requires a coordination strategy which is not provided by the CABS system, the Coordination Editor 330 can be used to define a new coordination graph to add to the agent coordination graph database 255. Using the UCP as starting point, new co-ordination graphs can be created for instance by adding a new sub-graph which introduces new nodes between some of the existing nodes in one of the predefined graphs, and/or by modifying one or more of the arcs in a predefined graph. Alternatively, a completely new graph can be created by following the process described earlier under "2.4.1 Coordination Software Module: Defining new coordination graphs". The key advantage of this novel approach is that it maintains a simple core (the UCP) while facilitating considerably more complex coordination techniques to be developed and installed. New coordination graphs can be assembled from primitives provided, based on the UCP and within constraints provided by the co-ordination editor 330. The editor 330 ensures that the designer of a new protocol does the following:

1. starts with the UCP;
2. identifies the parts of the UCP where it is necessary to add the extra complexity to realise the new protocol; and
3. defines and implements the new graph either by adding a sub-graph or by refinement of existing arcs or nodes of a predefined graph.
4. if any new nodes or arcs need to be defined the editor 330 provides the user templates for these.

Thus, for each of the agents identified in Step 1, the user selects and/or develops zero or more negotiation/co-ordination strategies which the agent can invoke, via the Co-ordination Editor 330.

4.5 Step 5: Tasks Definition 520

For each of the tasks identified in Step 2, the following user inputs have to be made for each agent, via the task description editor 335:

1. Determine the average cost and duration of performing the task.
2. Exhaustively list as variables 550 all the items (resources) that are required before the task can be performed.
3. Exhaustively list as variables 550 all the items (products) produced once the task is performed.
4. Determine and note all the constraints between the consumed items (No. 2 above) and the produced items (No. 3 above), and within each group.
5. Determine if the task can be performed by directly executing a domain function primitive tasks) or whether it is in fact an abstract specification of a network of other tasks (i.e. it is a summary task).
6. if the task is primitive then provide the following two functions (a) one to execute to perform the task (a callback 555) and (b) one to compute the actual cost of the task once it has been performed. For summary tasks provide a description of the summary tasks in terms of its component tasks.

Tasks consume certain resources to produce their products, with each executing task lasting for a finite time interval. The CABS platform provides a Variables Editor 355 using a frame-based object-attribute-value representation for defining the consumed and produced items.

The constraints between and within the consumed and produced items serve to delimit each task to specific well-defined cases. For instance, a task may call on a particular resource but there may be a constraint on the resource for that particular task, such as processing capacity or equipment type. A Constraints Editor 370 is also provided to describe constraints between the variables to ensure that tasks use realistic variables and that each task output equals the input to the next stage. This can be extended to setting inequalities, for example saying what an output should not be, for example integer/non-integer.

In addition, a Summary Task (Plan) Editor 365 is provided for listing component tasks of summary tasks. This editor allows summary tasks to comprise (i) simple actions (ii) multiple optionally parallel actions (iii) multiple (mandatory) parallel actions (iv) guarded actions (selections), and (v) iterative actions. Furthermore, these actions can be linked as a network, with a facility to constrain the variables at the endpoints of each link.

Below is an example of a task description created using the task description editor 335. The task describes the fact that to create a link from A. (?Link-141.from) to B (?Link-141.to) a link is needed from A (?Link-131.from) to some location X (?Link-131.to) and another link from X (?Link-136.from) to B (?Link-136.to).

The consumed_facts of the task list the resources required in performing the last, i.e. the links from A to X and from X to B. The produced_facts lists the resource which will be produced once the task is performed, i.e. the link from A to B. The constraints specify relationships between the consumed and produced facts. For example, the constraint "?Link-141.from=?Link-131.from" specifies the condition that the source of the produced link should be the same as the source of one of the required links. These and similar constraints will be enforced at runtime by the planner 220 of the agent ensuring that the variable ?Link-141.from is bound to the same token as ?Link-131.from.

The ordering specifies the order in which the preconditions should be tried. In this case it states the planner should attempt to obtain a resource satisfying the resource description ?Link-131 before attempting to obtain a resource satisfying the description ?Link-136.

A consumed_fact resource description with the scope field set to local is a flag to the planner 220 that it should only try to obtain the required resource locally, i.e. not subcontract-out the resource to another agent. Consumed facts with global scope fields can be sub-contracted out to other agents for production. For a produced_fact, if its scope field is local, this is signal to the planner not to use this task when trying to achieve that particular. A local scope field indicates the task can be used when trying to produce the resource.

The following is an example of a task description:

```
(:name LinkA2B
 :time 1
 :cost 70
 :consumed_facts ((:type Link
                    :id 136
                    :var true
                    :scope local
                    :attributes (:to ?var–138
                                 :from ?var–139
                                 :no ?var–140
                    )
                  }
                  {:type Link
                    :id 131
                    :var true
                    :scope global
                    attributes (:to ?var–133
                                :from ?var–134
                                :no ?var–135
                    )
                  }
                 }
 :produced_facts ((:type Link
                    :id 141
                    :var true
                    :scope global
                    :attributes (:to ?var–143
                                 :from ?var–144
                                 :no ?var–145
                    )
                  }
                 }
 :constraints ((:lhs ?Link–131.from :op = :rhs ?Link–141.from)
               (:lhs ?Link–136.to :op = :rhs ?Link–141.to)
               (:lhs ?Link–131.to :op = :rhs ?Link–136.from)
               (:lhs ?Link–131.no :op = :rhs ?Link–141.no)
               (:lhs ?Link–136.no :op = :rhs ?Link–141.no)
               }
```

```
-continued

:ordering((:lhs ?Link–131 :op < :rhs ?Link–136 )
        }
}
```

An interesting aspect of task definition in this way is that it can enforce optimality. For instance, by including deadline constraints together with resource definitions, inadequate resources become apparent. It may actually be necessary for the system user to extend or add to the resource available.

For instance, if the agent system is concerned with processing call record data in a telecommunications system, the technical processes involved might be mapped onto tasks as follows:

i) information received at call record centre;
ii) information sorted by priority;
iii) information passed to appropriate resource/people; and
iv) exception handling e.g. "resource not available".

If the exception handling step throws up "resource unavailable" it may be extremely important that further resource is made available. This might be the case where the call record centre supports fault location. The deadlines for getting network capacity back into service may be unextendible for instance for certain categories of customer. It would therefore be very important to the service provider that the call record centre has the resource to process the call records within the time constraint.

4.6 Step 6: Domain-specific Problem Solving Code Production 525

In order to output a functional, collaborative agent, the CABS system has to generate actual code. The data which a CABS agent requires is of two types: declarative and procedural. Predefined objects provide the procedural side. The declarative information is all captured via the editors and task descriptions. At compile time for an agent, for aspects which will be common to all agents, such as the Mailbox 200, the code generator can simply take a dump of code associated with the agent shell 300. For information such as task and resource information which is agent-specific, this is all dumped as database files and linked at compilation with the mailbox code etc for each agent.

That is, for all defined agents it is necessary to generate all components of code and databases, dump in directories, together with agent relationships, co-ordination abilities and an optional visualiser, and compile. Effectively, this is making an instance of the objects of each agent, then adding relationship and co-ordination information and standard components.

It is also necessary however for the user to provide domain specific code to implement task functionality. That is, the user must provide code for all of the functions for computing costs for a primitive task, and for providing callbacks 555 to control external systems. This is done using the code generation editor 360.

This is the only place where the developer needs to define any executable code. CABS can define prototypes for these functions and also provides an API library 380 for use by developers in their code production.

The output of CABS 100, in the form of software agents, is distributed to the user environment via scripts 390. Existing systems can then be linked to the agents using an API of a wrapper class, defined by the system, which wraps code inherited from the component library together with the user-supplied data.

5. DEBUGGING AND VISUALISATION

It is difficult to create any single program, even a program which interacts with no other programs, which has no faults or errors in it. It is an order of magnitude more difficult to analyse and debug distributed software which contains multiple agents. The behaviours that emerge from the overall distributed software may not be at all what was expected. Further, the communication is often at such a high level that it is not possible to look directly at data involved. Even an object based system can be designed to allow the programmer to look at the actual data involved in a sequence of events but agents, using message-based communication, may simply not enable the programmer to do so.

Clearly, it is important to analyse what is going wrong so that it can be corrected. Approaches used in singular 'agent' applications may be used but are frequently inadequate in analysing and debugging distributed software systems.

For example, fault analysis can be done as a "post mortem" exercise where the data is stored at the time of failure which later provides a "snap shot" of the prevailing circumstances, from which an attempt can be made to find out what caused the failure. A known debugger, described in international patent application No: WO93/24882 in the name of the present applicant, shows how such data can be captured in a history file which can later be 'played', 'replayed', 'rewound', 'fast forwarded', etc.—video style.

Such an approach may be helpful in some circumstances with distributed software, but certainly not all. There are many classes of errors which occur in multi-agent systems. There may be structural errors at the level of singular agents within the multi-agent system, such as wrong or missing aquaintance relationships between agents, missing resources, incorrectly specified (typically short) times to run tasks etc. There may be functional errors, ie errors which relate to the logic of the tasks that the agents are performing. These can be compounded by the fact individual agents may be functionally 'correct', but the emergent behaviour of the overall set up of distributed control agents may not be what was expected. This is typically due to what might be called co-ordination errors. In some cases, such behaviour can lead to incoherent multi-agent systems.

Some examples of the sort of undesired behaviours which emerge from such systems include the following:

Deadlock: where agents may be contending for shared resources. An agent may grab a vital shared resource and fail to relinquish it for some reason, perhaps because of some failure for example at the level of the individual agent. But this resource is invaluable to other agents who 'hang up' waiting for this resource to be relinquished. Basically, deadlock refers to a state of affairs in which further action between two or more agents is impossible.

Livelock: where agents continuously act (e.g. interact or exchange messages), but no progress is made in solving the problem at hand. This is common in cases where the agents co-ordinate their activities via decentralised planning. Here, the agents can indefinitely exchange subplans without necessarily progressing the co-ordination effort, especially where there are no structural checks to detect and prevent indefinite loops in the planning process.

Chaos: Chaotic behaviour is always potentially possible in a distributed setting.

Such behaviours, in addition to standard 'incorrect' behaviours or bugs on the part of individual agents, frequently lead to uncoordinated behaviours. Naturally, a distributed control system should normally be coordinated. A correctly coordinated set-up fully exploits the capabilities of individual agents and minimises conflicts, resource contentions and redundancy between them. Clearly then, co-ordination is a desirable property of agent systems.

As well as debugging, visualisation also allows the user to confirm, understand, control and/or analyse the behaviour of the system.

Visualisers of the type described below can provide means to analyse and debug such distributed control software so that the behaviours obtained are as intended by the designers. The visualiser provides a generic, customisable and scaleable visualisation system for use with a domain-independent toolkit for constructing multi-agent applications. The visualiser particularly described is generic in the sense that it could be used with any application developed using the toolkit, and customisable in the sense that it provides building blocks, for constructing application specific visualisers. The scaleability requirement implies it should support visualisation of systems comprising any number of agents with limited degradation in performance. The distributed nature of multi-agent applications necessarily required that the visualiser should be able to visualise remote agents across a wide area network. Further, for administrative and debugging purposes, it is important that the visualiser function both online and off-line.

In embodiments of a visualiser according to the present invention, there is provided an arrangement for analysing and locating unintended behaviours in distributed control systems, which arrangement comprises a suite of tools which all provide different viewpoints to the analysis of the distributed control software system.

All the different tools store different state data. Although no tool is capable of providing a complete analysis of the distributed system, the combination of one tool with another can. Different tools provide or suggest diagnoses. Where the evidence of one tool corroborates that from another tool, the trustworthiness in that diagnosis is increased. There is therefore a greater likelihood that the diagnosis may lead to a successful debugging of the problem. Where the evidence is conflicting, the combination of one tool with another may eliminate a hypothesis or be suggestive of other possible diagnoses.

The tools in the current CABS Visualiser/Debugging tools suite include:

A Society Tool: which shows the interactions (messages passed) between different agents in the whole society. This includes a video type tool which is capable of recording the messages passed between different agents for later "post mortem" analysis. These messages are stored in a database from which relational queries can be made for more in-depth study of the interactions. This tool can be used to analyse either a single agent or a society of agents.

A Statistics Tool: which captures various statistics on individual agents (e.g. the types and the numbers of messages being exchanged by agents). For example, it answers questions like 'How many messages were sent from agent A to agent B during some particular time frame?' or 'Plot me the number of messages that Agent A has been receiving over time', etc. The statistics tool provides pie and bar chart type visualisation of individual agent activities in addition to various graphs. With both the video and the statistics tools, you can select the agents of interest and study their recorded agents' states more closely. This tool can be used to analyse either a single agent or a society of agents.

A Micro Tool: which shows the internals of an agent to some degree of abstraction. Indeed, frequently just by watching the micro tool, the designer is able to ascertain if the agent is 'dead', 'deadlocked' or 'alive'; alternatively, he or she may ascertain if parts of the agent's internals are failing for some reason.

A Reports Tool: this provides a GANTT chart type presentation of the overall task which an agent for example may be controlling. Typically, an agent enlists the help and services of many other agents, and this tool allows the designer to choose some particular agent and one task (of possible many tasks) that the agent is controlling. This shows up a GANTT chart of how it has decomposed the task (i.e. what sub-tasks there are), which tasks have been allocated to whom, where the execution of the task has reached, and what the statuses of the different sub-tasks are (e.g. running, failed, suspended or waiting).

Control Monitor Tool: this is a very important administrative tool which is used for killing all agents, suspending some agents, suspending or failing some of the tasks they are performing in order to study the emerging exception behaviour, etc. This is also an important testing and debugging tool in the sense that certain agents may be suspending, killed from the society, etc. so that specific agents are studied more closely.

The visualiser 140 comprises a software agent having the same general framework as any other of the collaborative agents in a CABS system. It has the capability of pulling data off other agents in the system. It is passive in the sense that it does not negotiate with other agents but it registers itself with the name server 135 and also visualises itself.

Figure 10:
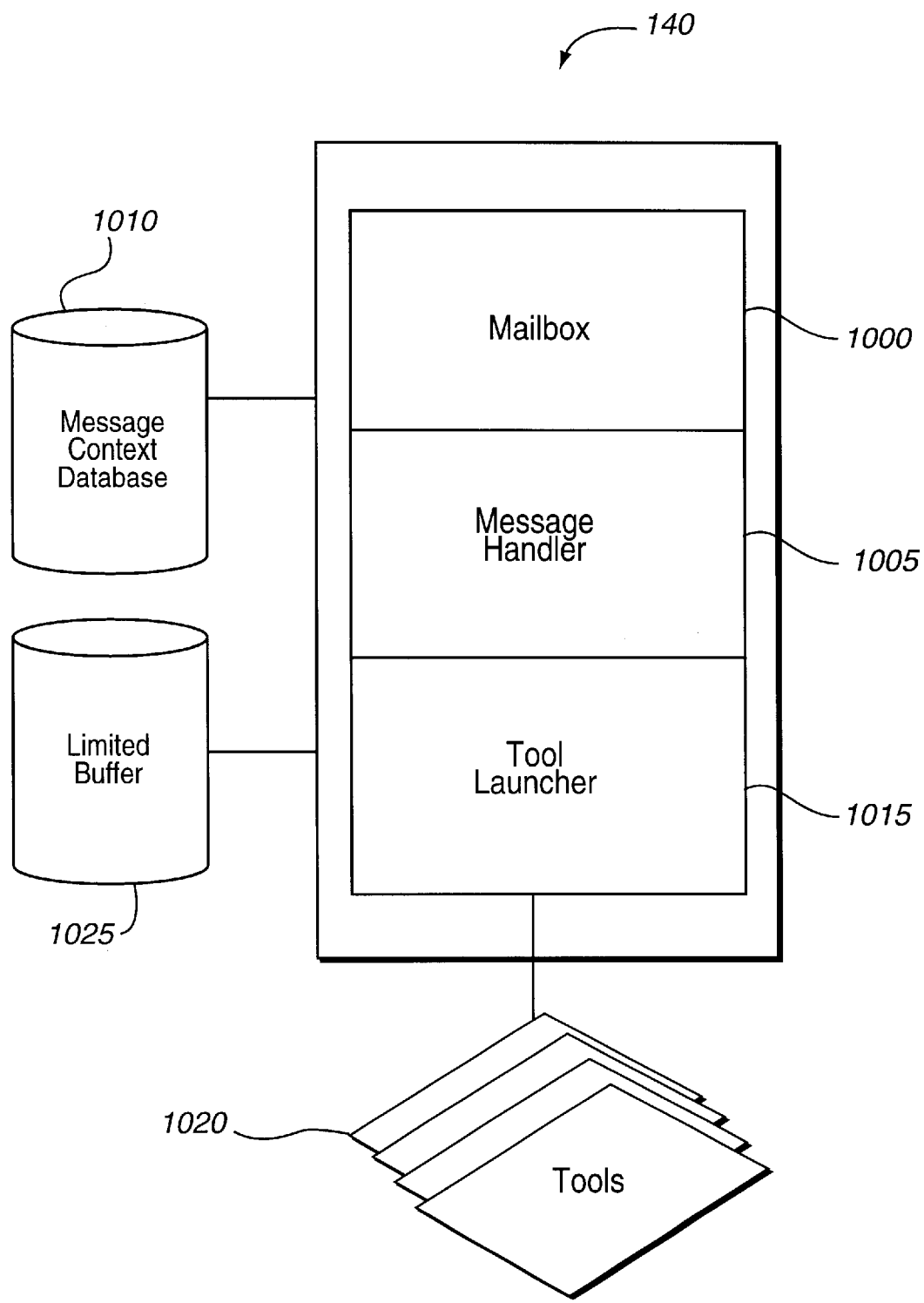
FIG. 10 shows a debugging and visualisation system for use with the agent-based control system of FIG. 1.

Referring to FIG. 10, the overall architecture of the Debugging/Visualisation Software Module 140 comprises a central hub made up of a mailbox 1000, a message handler 1005, a message context database 1010, and a tool launcher 1015. The hub has available to it a set of tool outlines 1020.

The mailbox 1000 provides facilities for messaging between the Debugger/Visualiser 140 and other agents, using the common agent communication language which in this case is KQML.

The tool launcher 1015 launches ton demand by the user) instances of the different tools in the tool set, namely instances of the Society, Statistics, Micro, Reports, and Control Tools. There are a large number of dimensions along which a multi-agent system can be visualised. Developing a single complex tool which supports all the different visualisation modes could make the visualiser difficult to use, inflexible and difficult to maintain: hence the use of a suite of tools, the tool set, with each tool sharing a common look and feel and being dedicated to a single visualisation task. All tools are launched from a central hub and share a common interface with the hub. This way, the visualiser is easier to maintain and readily extensible. The set of tools selected are those which have been found most useful in visualising, controlling and debugging multi-agent systems.

Primarily, the visualiser 140 sends request messages to other agents for data which they hold. It queries the name server 135 for agent addresses and then uses those addresses. The message handler 205 of the receiving agent routes the received request message appropriately, depending where the data of interest will be located. Data received by the visualiser 140 from all the other agents is stored, retrieved and processed for appropriate display.

The visualiser 140 can also install data in an agent. It can therefore be used to modify an agent's behaviour. This is further described below.

The message handler 1005 of the visualiser 140 handles incoming messages received by the mailbox 1000 and delivers them to tool instances that have registered an interest in messages of that type. Tool instances register an interest in receiving messages of a particular type by using the message context database 1010 which is consulted by the message handler 1005 during its processing. Thus, each tool instance interested in receiving report messages of a particular type from a set of agents will first, using the mailbox 1000, send a request to those agents that they should send report messages to the Debugger/Visualiser 140 whenever events of that type occur (using an "if, then" type of control instruction), and second, register in the message context database 1010 an interest in receiving copies of all incoming report messages of the desired type. This arrangement allows a user of the Debugger/Visualiser to dynamically decide at runtime the set of events he/she is interested in monitoring, and also to change at any time this set.

In particular, the KQML reply_with (outgoing message) and in_reply_to (incoming message) files are used to associate an identifier to each message, which is unique to tool instances and event-types. This way, the message handler does not need to scan the contents of a message to determine which tool instance requires it. This arrangement allows users of the visualiser to decide at runtime the set of events they are interested in monitoring, and also to change the set at any time. Furthermore, extension of the tools suite with a new tool and/or monitoring of a new event type requires no modification to the basic support infrastructure.

The visualiser 140 is not a full repository of data for an agent system. It only stores data for a limited time frame, for instance two days. If the user wants to store persistent data, it needs to be stored, for instance, in the video type tool included in the Society Tool. The time frame for which the visualiser 140 will hold data will be affected by the size, activity and complexity of the CABS agent system and, if there are for instance too many agents, the visualiser 140 may need to be extended.

The visualiser 140 only provides a historic mechanism; it lags the real-time activity of the system. It is possible for the visualiser 140 to receive messages in the wrong order. To avoid misinterpretation, the visualiser 140 is provided with a limited buffer 1025 which re-organises messages in their correct time sequence. (It should be noted that the messages consequently are necessarily time stamped.)

Figure 12:
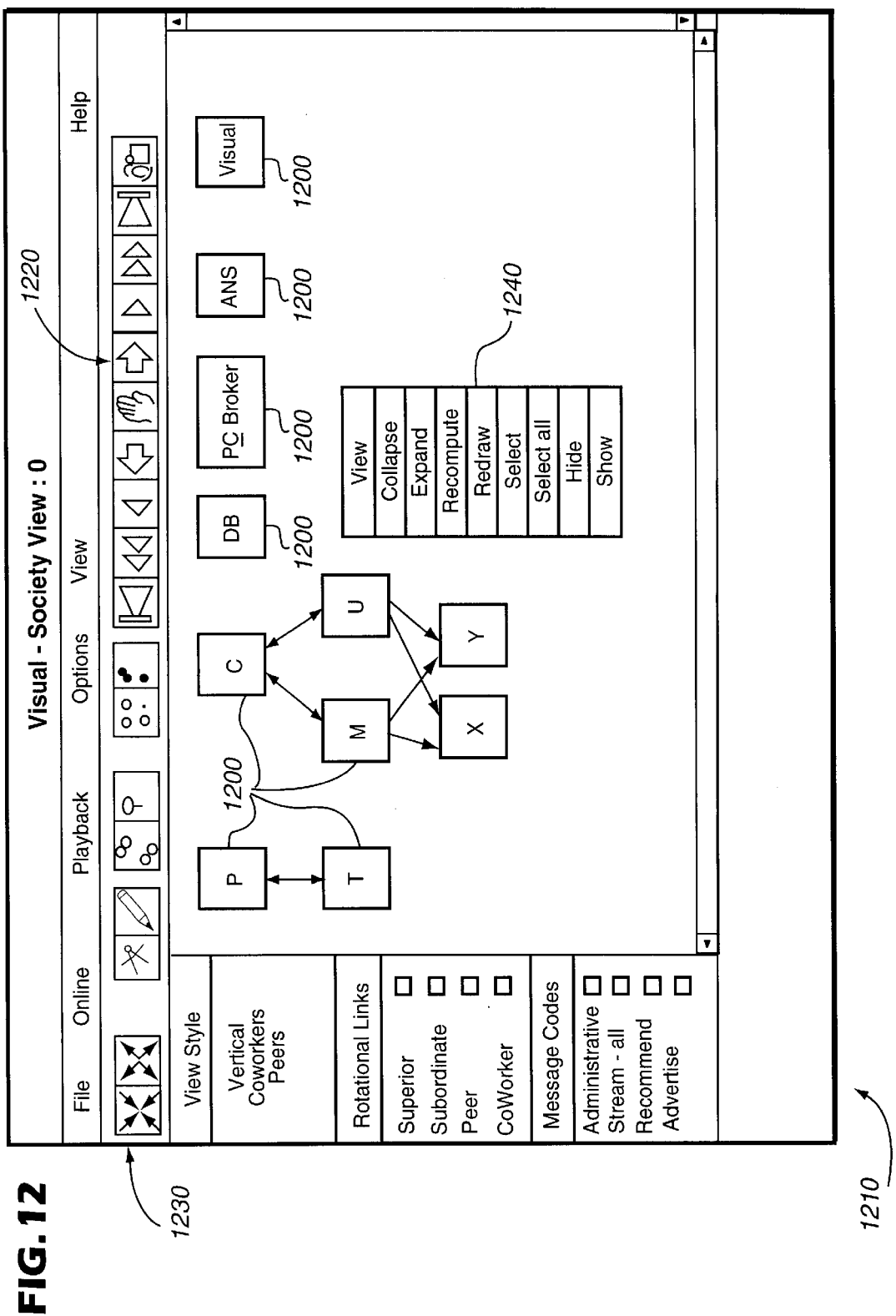
FIG. 12 shows schematically an example of the screen-based output of a "society tool" of the visualisation system in use.

Referring to FIG. 12, in a simple implemented scenario, the domain is supply chain provisioning in which agents collaborate to manufacture and/or provision goods making up a service. FIG. 12 shows a view of the domain which could be produced by the society tool. In the example, we have five principal agents. C, a computer manufacturer, has two subordinates, M and U. M produces monitors, and knows C as its superior and U as its co-worker. U produces central processing units (CPUs), and similarly knows C as its superior and M as its co-worker. Both M and U share two subordinates (X and Y). C knows of another agent P as a peer who produces printer ink and toner cartridges. P has a subordinate T that produces printer ink and toner cartridges.

Co-workers are agents in the same organisation who have no authority relation between them while peers are agents belonging to different organisations.

In the example, the production of a computer requires the base unit (CPU and monitor) as well as an appropriate printer.

In the environment are three additional support agents: an agent nameserver (ANS) which provides a white-pages facility for agent address look-up; a broker agent (PC_Broker) which provides a yellow-pages facility through which agents find other agents capable of performing a task; and a database proxy agent (DB) whose sole function is to store and retrieve messages from proprietary databases on demand from visualisers. These agents also communicate in the common agent communication language (ACL). Finally, there is the visualiser agent itself (Visual).

Use of any of the tools in the suite requires that once the tool is launched users connect to one or more nameservers. In a multi-agent system environment, nameservers contain the names and addresses of all "live" agents in the environment. Thus, connecting to a nameserver involves sending a request to the nameserver to list all agents in the environment and any agents which later come online. In an environment with many nameservers, the user can select which to connect to, effectively filtering the visualisation effort to a subset of agents of interest.

5.1 The Society Tool

The society tool of the visualiser sends out three types of request messages.

| Society Tool Messages | | | |
|---|---|---|---|
| Message Type | To WHOM | Purpose | What is returned |
| Request | Agent name server | return addresses of all agents | Addresses |
| Request | All agents | return relationships | Relationships |
| Request | None, some or all agents | cc all messages | cc'ed messages |

Referring to FIG. 12, the society tool allows a user to select a set of agents and view (a) the structural organisational relationships, and (b) the messaging between them. It therefore accesses the acquaintance models 215 stored in the individual agents. It can also set a flag that causes the message handlers 205 of the agents to copy all messages to the visualiser 140.

To view (a) or (b), users use menu items to send requests to designated subsets of agent requesting they update the tool instance with their current knowledge of the organisational relations, or to send copies of all their outgoing messages to the tool instance respectively.

The organisational relationships describe role relations such as superior, subordinate, co-worker or peer. Knowing these relationships is important during debugging because they affect how the agents might coordinate their activities. For example, the agents may be configured to try performing all tasks first, if that fails delegate to subordinates, if that fails subcontract to co-workers, and only if all fail subcontract to peers. The tool supports graphical layout of the agents according to role relationships. Current layouts include a vertical layout (as shown in FIG. 12) emphasising the vertical superior-subordinate relationship, a horizontal circular layout emphasising co-workers, with groups of co-worker arranged in circles, a horizontal circular layout emphasising peers, with groups of peers arranged in circles, and a single agent-centred layout in which all the other agents are centred about a user-designated central agent. In the layout graphs the links between the agents are colour-coded according to their role relationship. Facilities are provided to collapse, expand, hide and show nodes of the various graphs. The different layouts are important especially when used with the messaging feature of the tool, because they allow the user to readily see the organisational structure of the agents and how coordination proceeds within that structure. This allows him or her to identify bugs either in the way in which the agents are organised, or in the manner in which coordination proceeds within the organisation.

It should be noted that no single agent necessarily possesses a full picture of the organisational structure. It is the responsibility of the society tool to integrate local information returned by the agents into a global picture of the organisation.

Messages between agents can be colour-coded (for easy visualisation) by type, e.g. all request messages in one colour, or by content, e.g. all messages pertaining to a particular job in one colour. In addition, the tool supports the filtering of messages before display. Messages may be filtered by sender, receiver, type or content. For example, a filter option might state "show only counter-propose messages [type filter] from the set of agents . . . [sender filter] to the set of agents . . . [recipient filter] about job . . . [content filter]". These features facilitate debugging by allowing the user to focus-in on the particular messages of interest. Further, combined with the off-line replay facilities with forward and backward video modes (discussed next), they provide a powerful debugging tool.

As mentioned earlier, the society tool also provides facilities for the storage in a database for later playback of the messages sent and received by the agents. Again, message filters can be used during storage and/or replay to select particular messages of interest. Replay facilities support the video metaphor, allowing a user to review the messages in forward or reverse mode, in single step fashion or animated. Further, because the messages are stored in a relational database, users can make normal (eg relational) database type queries on the stored messages, e.g. "how many messages did Agent A send out regarding Job 21". The video replay facilities with message filters and the database query support significantly enhance the debugging effort of a user, by allowing him or her to focus-in or out and dynamically change perspectives while trying to make sense of the interactions between the agents.

In the graphical user interface shown in FIG. 12, it is possible to see the layout of agents 1200 in the supply chain provisioning scenario described above. On the left of the window are layout and view controls 1210. Toolbar buttons 1220 on the right control video-style replay of messages while those on the left 1230 and a pop-up menu 1240 control the position and visibility of the agent icons.

The actual storage of messages in a database is performed by opening a link to a database proxy agent, and sending to it copies of the messages to be stored. Retrieval proceeds in a similar manner, albeit in reverse. This arrangement provides a flexible approach since any proprietary database system can be used simply by interfacing it with a standard proxy which understand and communicates in the agent communication language.

5.2 The Reports Tool

In a collaborative multi-agent set-up, generally it is the behaviour of the society as a whole (i.e. the combined inputs of all the agents) which is important and not that of an individual agent. A typical problem in debugging multi-agent systems arises from the fact that each agent provides only a local view of the problem-solving effort of the society.

Each agent only knows about jobs and subjobs which have been allocated to and/or by it. No single agent holds data for the overall breakdown and the state of all the jobs.

For example, in order to produce a computer, agent C might contract out part of this task to P to provide a laser printer. P in turn, might delegate part of its contract to T to provide a toner cartridge. Because of the autonomy of the individual agents, C is only aware of the part of the task it is scheduled to perform, and the part it contracted out to P; it remains unaware of the part delegated by P to T. Thus, a user viewing any one of the agents in isolation gets an incomplete picture of the problem solving effort of the society. So, if for example C reports a failure to perform the task, the user will be unable to immediately determine, for instance, that the root cause of the failure was because T failed to provide the toner cartridge as requested by P.

The Reports Tool is able to request the relevant data from each of the agents, collate it and depict it. The Reports Tool applies the algorithm set out below to collate the data and generate a full picture, which can then be represented in a GANTT chart of the type shown in FIG. 7.

Referring to FIG. 8, for this tool, note that a job J given to an agent A may be split up into subjobs J1 and J2 which are allocated to agents B and C respectively. Subjob J2 may further be split into J21, J22, J23 and allocated to other agents E, F and G. Subjob J1 may also be split, agent B retaining responsibility for a subjob J11 but allocating a subjob J12 to agent D.

The important thing is to ensure each top level job, such as job J, has a unique identifier which is maintained even if subjobs (and subsubjobs, etc) of this top-level job get generated. This is recorded in each agent by means of the commitment table of FIG. 9 and as a result of decisions by the co-ordination engine and reasoning system 210. So when Agent A splits a job having identifier "J" into subjobs J1 and J2 and allocates them to other agents, these other agents maintain the identifier "J", even when they themselves further split the subjobs (J1, J2, etc) into yet further subjobs and allocate them to yet other agents. Note that a subjob "J1" has added its own identifier "1" in addition to "J" to trace where it originates from if it gets further decomposed, and this applies when a subjob such as "J1" gets further decomposed into "J11" and "J12". In this case, both identifiers "J" and "1" have been retained.

Thus, using a root goal identifier and parent-child links, the report tool can graph a global task decomposition across the society. In fact, the same mechanism is used in the society tool to colour-code messages by goals.

Hence, the algorithm of the Reports tool for processing the data (retrieved from all the agents) is as follows:

i) for some Agent "A", select a job/goal owned by that agent;

ii) retrieve the unique identifier for the goal, for example "J";

iii) do a search to retrieve all other jobs/goals with that identifier and return both the jobs/goals and their relationships (with respect to the selected goal "J");

iv) Graph the relationships land states), as shown in FIG. 7.

Referring again to FIG. 7, consider the scenario with three agents A, B, and E. In order to perform a job, J1 say, Agent A might delegate a subpart (J11) of this job to Agent B. who in turn delegates a subpart (J111) of J11 to Agent E. Because of the autonomy of the individual agents, Agent A is only aware of the subpart of J1 it is scheduled to perform, and the subpart (J11) it delegated to Agent B; it remains unaware of the subpart (J111) delegated by Agent B to Agent E. Thus, a user viewing any one of the agents in isolation gets an incomplete picture of the problem solving effort of the society. So if, for example, Agent A reports a failure to perform J1, the user will be unable to immediately determine, by looking at Agent A, that the root cause of the failure was because Agent E failed to achieve J111.

The reports tool provides a global view of problem solving in a society of agents and is useful both as a debugging and an administrative tool. It allows a user to select a set of agents and request that they report the status of all their jobs to it. Next, the user can select an agent of interest and a job owned by that agent. (An agent owns a job if it is scheduled to perform the job or subpart at a root node in a task decomposition hierarchy for the job.) For the selection of agent and job, the reports tool generates the GANTT chart type graph 700 of FIG. 7 showing the decomposition 560 of the job, the allocation of its constituent subparts to different agents in the community, and the relevant states of the job and subparts. Other attributes of the jobs might also be shown on the chart, such as when each agent is scheduled to perform its part, their costs, the priority assigned to them by the agents, and the resources they require.

Figure 13:
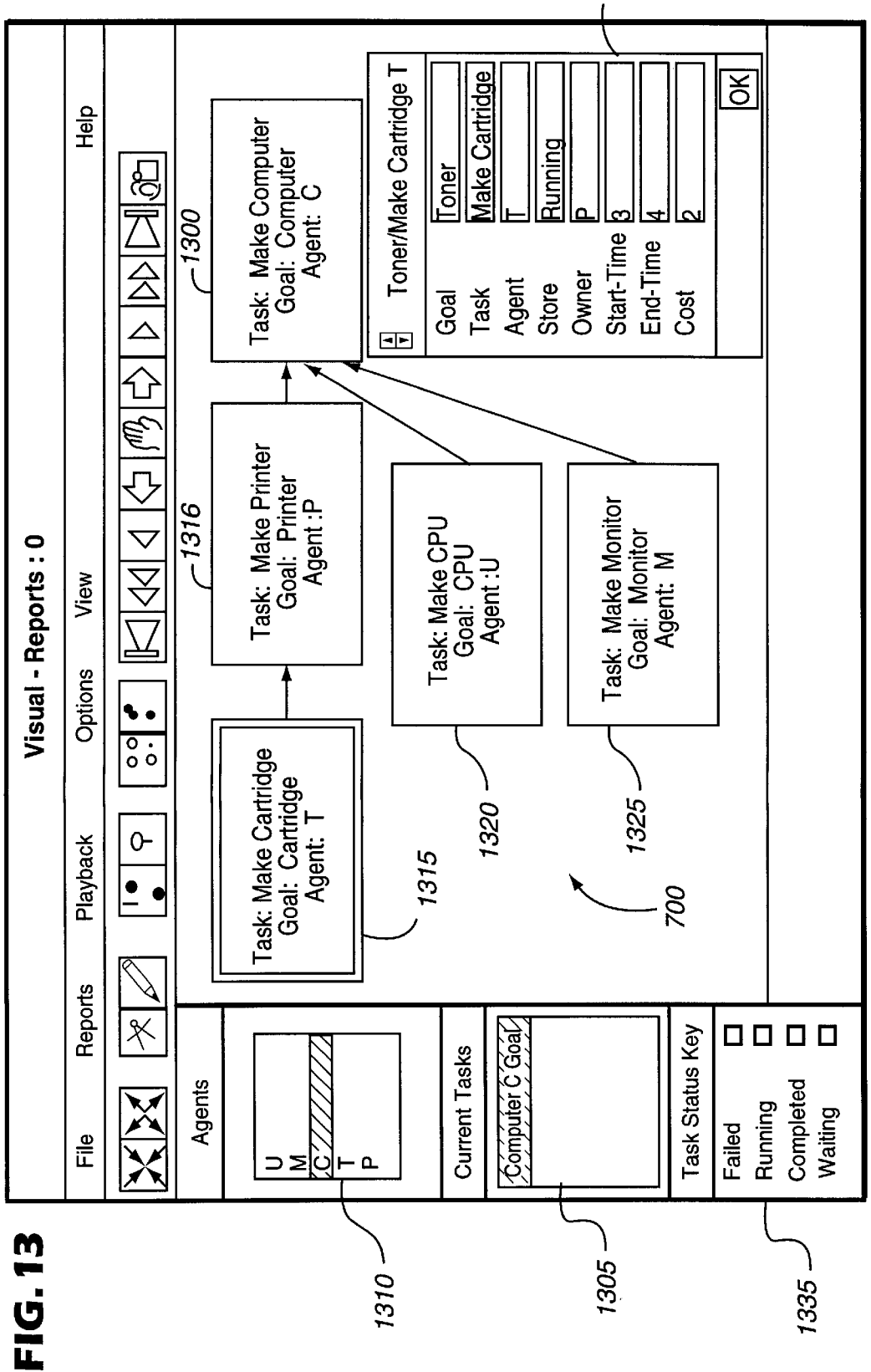
FIG. 13 shows schematically a GANTT chart as an example of the screen-based output of a "reports tool" of the visualisation system in use.

Referring to FIG. 13 and returning to the "MakeComputer" task mentioned above, the GANTT chart 700 might be displayed on screen with selection boxes for selecting the agent and task to look at. As shown, the selection boxes 1305, 1310 have been used to select task "MakeComputer" for agent C 1300. The GANTT chart 700 shows the decomposition of the "MakeComputer" task into MakeTonerCartridge (Agent T) 1315, MakeMonitor (Agent M) 1325, MakeCPU (Agent U) 1320 and MakePrinter (Agent P) 1316. The Task Status Key 1335 shows by colour coding (not visible in FIG. 13) that the MakeTonerCartridge and MakeMonitor tasks 1315, 1325 are running, the MakeCPU task 1320 is completed and the MakePrinter and MakeComputer tasks 1316, 1300 are waiting. A dialogue box 1330 has been brought up to show details of the MakeTonerCartridge task 1315.

The reports tool therefore needs access for instance to the task decompositions 560 and to the commitment database 245 in each agent.

As mentioned, the job graph created by the reports tool also shows the current status of each subpart of the job, i.e. either waiting, running, completed or failed. Thus from the graph a user is immediately able to determine the overall status of a job, and if the job fails where exactly it did so—which obviously aids the debugging effort. For easy visualisation, the different states of a job can be colour-coded in the graph.

FIG. 7 as a whole shows a task report 700 for job J1 owned by Agent A. The subpart J111 (Agent E) has failed, while J1 2 (Agent C) is running and J13 (Agent D) is completed. J11 (Agent B) and J1 (Agent A) are waiting, but because of the failure to achieve J111 will both fail unless action is taken to achieve J111 in some other way.

The tool also provides the user with facilities for collapsing/expanding sections of the graph and hiding/showing nodes on the graph—this is important in dealing with a very large graph since it allows a user to focus-in on the regions of interest, reducing too much detail which might hinder the debugging effort.

The algorithm for ensuring the correct integration of task descriptions into graphs relies on two facts: first, the agent on which the goal is initiated assigns a system-wide unique identifier to the goal that is propagated down the task decomposition hierarchy of the goal. Second, whenever an agent decomposes a task into subtasks, it creates unique identifiers for the subtasks and records the identifiers with the parent task (this happens whether or not other agents perform the subtasks). Thus, using the root goal identifier and parent-child links, the report tool can graph the global task decomposition across the society. (in fact, the same mechanism is used in the society tool to colour-code messages by goals.) The same mechanism also allows the display of joint graphs, wherein two task decomposition graphs are linked by one or more tasks. This happens when side effects of a task in one goal decomposition graph are utilised in another.

Similarly to the society tool, the report tool also supports online logging of report messages to a database, and then subsequent off-line replay.

5.3 The Micro Tool

Figure 14:
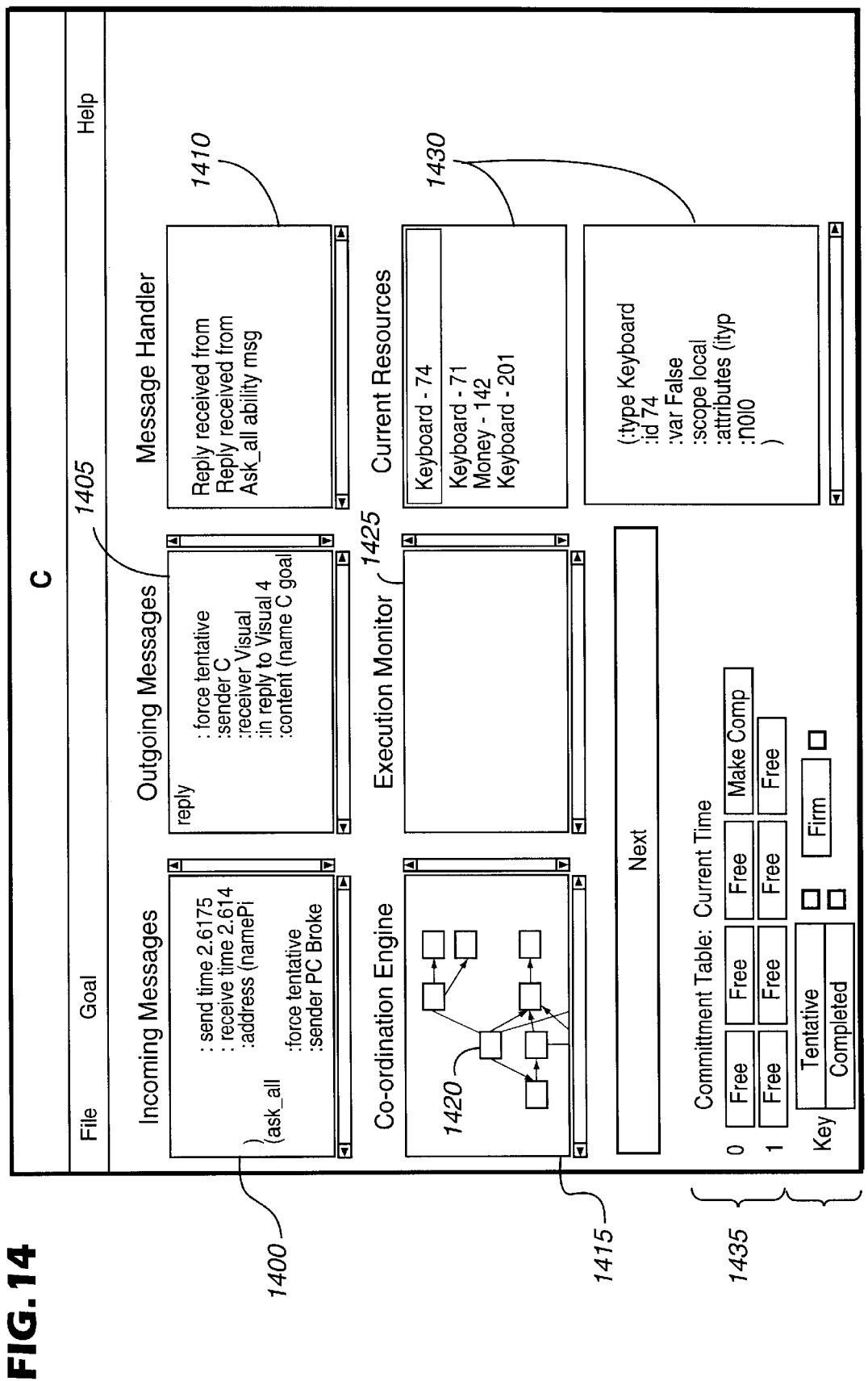
FIG. 14 shows schematically an example of the screen-based output of a "micro tool" of the visualisation system in use.

Referring to FIG. 14, the micro tool allows a user to select a single agent, Agent C as shown, and review its processing by looking at its current data and at the messages being sent and received by different components of the agent. For instance, it might look at the last ten messages for a selected component. Looking at threads in the mailbox, it might review messages under construction to go out, or messages recently received. It can request to see:

1. "Message in queue" 1400: most recent messages received and still to be dealt with;
2. "Message out queue" 1405: messages to be sent out;
3. "Message handler summary" 1410: a summary of the actions taken in response to incoming messages, for example, to what module of the agent has the message been dispatched for detailed processing;
4. "Co-ordination graph" 1415: visually depicts the dynamic state of execution of the co-ordination engine so as to visualise the progress of the realisation of some goal. Where there are multiple goals the agent is trying to achieve, the user can select a particular one in order to visualise its progress. As each node 1420 of the graph is running, it shows GREEN. If that node fails, it shows RED;
5. "Execution monitor summary" 1425: a diary detailing the tasks the agent has committed itself to performing, and the current status of those tasks (i.e. waiting, running, completed or failed) e.g. the monitor might indicate a task which has failed to start because of inadequate resources (for example, results expected from another agent might never arrive or arrive too late), or it might flag an executing task which has been stopped because it over-ran its scheduled allocation of processor time;
6. "Resource database summary" 1430: summary of the resources the agent manages. It also shows which are free, which have been allocated, and to whom; and
7. "Commitment table" 1435: visual depiction of how tasks have been scheduled. This is a summary of the results of monitoring executing tasks or tasks scheduled to start execution; eg the monitor might indicate a task which has failed to start because of inadequate resources or it might flag an executing task which has been stopped because it overran its scheduled allocation of processor time. As shown, Agent C is firmly committed to the task MakeComputer at time 4.

The micro tool provides a user with a finer look at the internal processing of an agent and has obvious debugging potential. For example, the flagging of executing tasks which have been stopped because they over-ran their allocated processor time might indicate to a user that he or she underestimated the amount of time required to run those tasks. (It is assumed that users/developers provide a conservative estimate of the processor time needed to run each task, which is used by the agent in scheduling its activities.)

As another example, by looking at the current state of the coordination process for a job (from the graphical depiction of the coordination process), a user might be able to infer, for instance, why the job was rejected by the agent. Since each node of the coordination graph indicates a particular state of the process, the trace of a job on the graph informs the user of most of all there is to know about the coordination of that job. For instance, from a trace, a user might infer that Job-O, say, failed because it required certain resources which the agent did not have; further, the agent could not find any other agent that could provide the resource within the required quantity, time, cost and other constraints.

5.4 The Control Monitor Tool

It allows for the following functions:

Browse-through

Add

Modify

Delete

These functions act on current goals, jobs, resources, tasks, organisational relations and knowledge, and co-ordination strategies. Other functions include:

Suspend (jobs or agents)

resume (jobs or agents)

Kill (agents)

These latter three are done by sending request messages to these agents; with the contents being the above (e.g. a suspension notice).

The control monitor tool again works in relation to single agents. It provides an online version of the original CABS agent-building capabilities.

The control monitor tool allows a user to select an agent of interest and browse-through, add, modify or delete its current jobs, resources, tasks, organisational relations and knowledge, and coordination strategies. Further, the user can suspend or resume jobs, and also suspend, resume or even kill agents. A facility is also provided for the user to tune various parameters of an agent such as how long it waits for replies from other agents before assuming a null response, or how the agent should split its time between performing tasks it has already committed to and coordinating new tasks. Because different multi-agent systems or applications may use different ontologies or data dictionaries to specify data items, this tool allows users to load an ontology database 260 defining the ontology of their specific system or application.

The control monitor tool is useful in debugging and/or analysing the behaviour of a society of agents by allowing a user to dynamically reconfigure the society and analyse its subsequent behaviour. This is useful when testing hypotheses. The user can use it to study the effects of various changes on agents' constitution, organisational relations, co-ordination behaviour etc. For example, an agent might, contrary to expectations, consistently reject a job for which it has adequate know-how (task) but lacks the required resources although there are other agents in the society that can produce the required resources. Using the control monitor tool to browse through the tasks and resources of the agent, a user might convince herself that the agent possesses the know-how but lacks the resources. Checking the agent's list of coordination strategies may, for example, indicate that the agent does have the coordination ability to subcontract out the production of the required resources to other agents in the set-up. Since the agent rejects the job though, the user might posit two hypotheses, that either (A) the agent is unaware of other agents in the society that can produce the required resource, or (B) the time-out period that the agent waits for acceptance after sending out job request messages to other agents might be less than the time needed by those agents to determine whether or not to accept a job. Using the control tool to browse through the organisational relations and knowledge of the agent might confirm or refute hypothesis (A), and again using this tool to increase the agent's wait-acceptance time-out might confirm or refute hypothesis (B).

Other tools such as the micro or society tool might also be used in tandem with the control monitor tool to investigate these hypotheses. Using the society tool, for instance, the user might observe the agent sending out job request messages—refuting hypothesis (A); and using the micro tool the user might observe that in the coordination trace for the job, the agent progresses past the wait-acceptance node before replies to its job request messages are received—confirming hypothesis (B).

A browser window for the control tool might for instance allow a user to remotely browse, add, delete and/or modify the task specifications of agents in a society. Such a window might show list boxes for the agents in the society, the set of tasks of the current selected agent, and the status of the selected task. A text area might show the specification of the current selected task. "Modify" and "Add" buttons might launch a task specification editor through which an existing task specification may be modified or a new task defined. The status of the tasks are set to OK when, as far as the tool is aware, the task definition in the tool is the same as that in the relevant agent's task database. A staus value of UNKNOWN indicates that the user has modified the task specification but, so far, the agent has not yet returned acknowledgement of receipt of the new specification.

The control tool is useful in debugging and/or analysing the behaviour of a society of agents by allowing a user to dynamically reconfigure the society and analyse its subsequent behaviour. That is, it allows the agent system to be redefined at runtime.

The strength in the control tool lies in the use of high level messages in communication, perhaps KQML and its related languages. With high-level messages, new specifications of whatever behaviour can be sent to an agent and it is the agent's function to interpret the specification into the relevant functionality. If one were to use object-level messaging such dynamism is immediately lost. An analogy is the relationship between interpreted languages such as Prolog and Lisp that provide dynamic redefinition of program behaviour and compiled languages such as C++and Fortran that do not.

Because different multi-agent system applications may use different ontologies or date dictionaries to specify date items, this tool allows user to load an ontology database defining the ontology of their specific application.

5.5 The Statistics Tool

Figure 15:
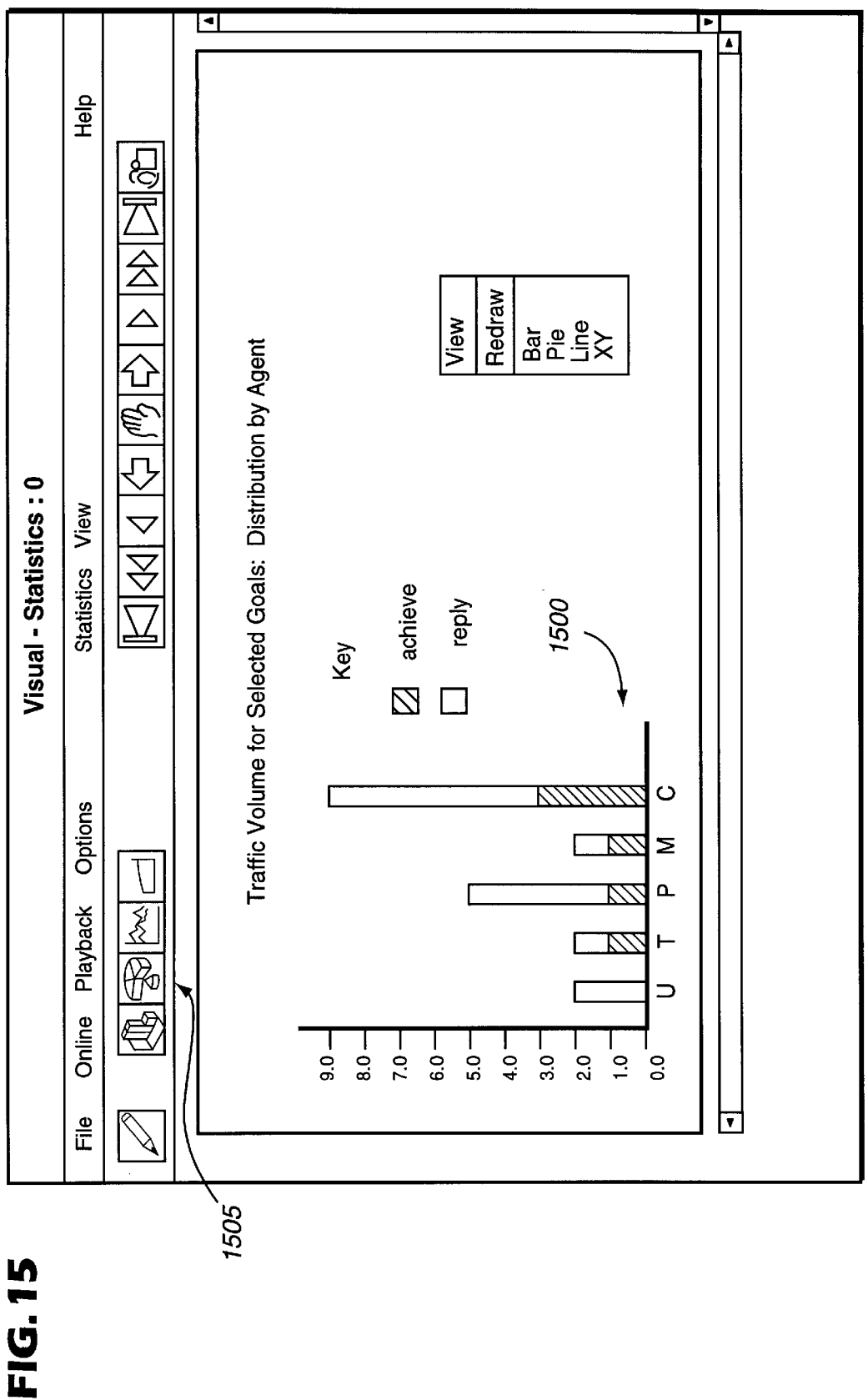
FIG. 15 shows schematically an example of the screen-based output of a "statistics tool" of the visualisation system in use.

Referring to FIG. 15, this tool allows a user to collate various statistics about a society of agents on a per agent basis as well as on a community basis. The statistics collected might include for instance, but are not limited to:

(a) the number of messages and their types sent by the agents over a time period;

(b) the number of messages sent by the agents in coordinating different jobs;

(c) the average loading of the agents, i.e. the proportion of time agents spend actually executing tasks; and (d) the coordination versus execution time ratio, i.e. how much time is spent coordinating tasks as opposed to actually running them.

Statistics such as these are particularly useful in debugging or fine-tuning the performance of a society of agents. For example, using the control monitor tool and the statistics tool, a user is better able to answer questions such as "what organisational structuring, and distribution of task and coordination know-how best minimises the time spent coordinating jobs and maximises the time spent executing them (i.e. increasing the profitability of the society)". If the agents in the society learn from experience, the statistics tool becomes even more useful in assessing the performance of different learning strategies since certain statistics such as the average number of messages sent by the agent per job and/or the coordination versus execution time ratio can serve as performance metrics for measuring learning success.

The particular screen shown in FIG. 15 shows the amount of traffic generated 1500 by the principal agents U, T, P, M, C in achieving the goal MakeComputer. As expected from the task decomposition 700 shown in FIG. 13, Agent C sends out three achieve-messages while Agent P only throws out one. The reply messages correspond to negotiation and post-negotiation (task management) dialogues.

The tool can support different display formats, such as histogram, pie, line, or xy-scatter graph formats for the display of statistics. The choice of format is user-determinable, using toolbar buttons 1505, although there are pre-specified defaults formats for the various statistics.

Similarly to the society and report tools, the statistics tool supports database saving and video-style replay of agent statistics. For generality, only raw (as opposed to processed) agent data is saved onto database, thus, on playback, any relevant statistic can be recreated.

5.6 An Extended Example

Returning to FIG. 8, while each tool described above is useful as a debugging aid when used in isolation, when used in combination with the other tools they provide even greater debugging and analysis support by giving the user a multi-perspective viewpoint of the agents' behaviour. By way of illustration, an extended example of using different tools to assess different aspects of agents' behaviour in a debugging problem is described below.

Consider a multi-agent society comprising seven agents A-G as shown in FIG. 8. The user believes that the agents have been configured such that given job J to agent A, the decomposition of the job across the society would proceed as illustrated; i.e. J1 to agent B, J2 to agent C, J12 to agent D etc. However, when job J is given to agent A, it reports a failure in planning out the job.

To debug this problem, the user might for example use the society tool, particularly the message storage, video-style playback and filter facilities to review the coordination activities of agents when job J was presented to agent A. The user notes, for example, that as expected, agent A sends out a request (Propose message) to agent B to achieve J1 and another request (Propose message) to agent C to achieve J2. Again, as expected agent B sends out a request to agent D to achieve J12. Agent C however sends out no requests, although it had been expected to send out three.

In a rerun of the scenario, using the micro tool to view the internals of agent C, it is noted from the trace of its coordination graph for job J2 that J2 was successfully decomposed into J21, J22 and J23, but the coordination process failed when no candidate agents could be found to subcontract J22 to. Using the control monitor tool to review the organisational relations and knowledge of agent C, it is noted that no entries specifying agents that could achieve J22 were listed in agent C's organisational knowledge-base—thus, an entry is added to agent C's organisational knowledge-base to fix this 'bug'.

The problem is again rerun and, this time, agent A reports success in distributing the task across the society but later reports failure due to inadequate resources when it tried to actually perform its subpart of the job.

Using the reports tool, in a rerun, the user notes that following-successful problem decomposition across the society, agents E, F, G and C successfully started and ran to completion their respective subparts of the job. However, agent D failed to achieve J12, which in turn caused the failure of agent B to achieve J1 and in turn that of agent A to achieve J.

The user reruns the scenario and uses the micro tool to monitor agent D. She notices that D successfully starts J12 but later stops it because J12 ran out of its allocated processor time (indicated by an execution monitor message). The control monitor is used to modify the definition of J12 to increase its estimated run-time.

The scenario is again rerun, and this time everything runs to completion.

Alternatively, task J12 may have had time to execute but produced the wrong outputs (ie the task body was wrongly specified). In this case, the micro tool will not detect that J12 ran out of time and the task body will have to be reviewed and corrected.

In a different fault scenario using the same arrangement of agents as shown in FIG. 8, the statistics tool may instead show that agent C in fact sends out two requests (Propose messages) in respect of the J2 task, although three requests would be expected. It is now possible to form the hypothesis that the cause of failure is located in agent C, probably due to one or both of the following:

(i) an error in the specification of the J2 task. The task specification is expected to be {J21,J22,J23}={J2}, that is, given J21, J22 and J23 then J2 can be produced. If there is an error in the specification, for example {J29,J22,J23}={J2} instead, then there would arise two Propose messages sent out for jobs J22 and J23, but no equivalent Propose message for J29. Agent C will not send out a Propose message for job J29 since it doesn't know of any other agent that can produce J29;

(ii) an error in a specification in the aquaintance database of agent C. Assuming the task is properly specified, then the most likely reason what the third propose message was not sent out would be (once more) that no agent is listed in agent C's aquaintance database capable of performing the third job.

The overall hypothesis that the failure lies in agent C can be verified by, for example, using the micro tool for viewing the internals of agent C. For instance, it might be noted from the trace of its co-ordination graph that agent C could not plan or co-ordinate the activities the activities involved in J2, thus confirming the hypothesis.

Regarding the hypotheses (i) and (ii), the control tool can be used to remotely review the task specification database of agent C. If that is correct, (i) is eliminated. To confirm hypothesis (ii), the control tool can be used to directly review the aquaintance database of agent C, checking all specifications relating to J21, J22 and J23 (by browsing through the aquaintance database of agent C using a task browser window of the control tool).

Alternatively, if the aquaintance database is large, it is possible to use the society tool to review the messages sent out by agent C. It might be discovered that agent C sent out messages to agents F and G to perform jobs J22 and J23 respectively. Now it is reasonably certain that the failure to perform job J was due to a specification error in the aquaintance database of agent C, regarding J21 (the goal) and agent E. This can be confirmed by using the control tool to review and modify the aquaintance database of agent C.

It should be noted that the suite of tools described above cannot detect every possible cause of failure in a multiagent system it is used to monitor but it makes the debugging task immeasurably easier.

Although described in relation to the particular CABS multiagent system described above, one or more of the debugging tools could easily be used with other multiagent systems, based on different architectures, agents, relationships and languages. It would simply be necessary that the agents of the debugging tool(s) and of the multiagent system being debugged were able to understand messages and other information, such as task specifications, in the same way so that the debugging tool(s) could understand what the messages concerned and could review and amend the other information.

Embodiments of the present invention can be used in relation to a wide range of multi-agent systems. For instance, it has been evaluated in particular in the following applications:

a travel management application involving 17 agents, in which a travel manager agent negotiates with hotel, air-line, car, train and taxi reservation agents to generate an itinerary for a transatlantic trip for a user;

a telecommunications network management application with 27 agents. Here agents controlling network links negotiate to provision virtual private networks for users. For this application the report tool was very easily customised to support a different display format for task decomposition graphs; and an electronic commerce application where agents buy and sell goods and services using different negotiation strategies. This application involved over 100 agents simultaneously performing many different tasks, and the colour-coding of messages by goal was essential in understanding the interactions between the agents.

Although different languages and hardware may well be found appropriate in various circumstances, embodiments of the present invention can be implemented entirely in the java programming language and run on Unix, for instance Solaris, and windows NT workstations.

What is claimed is:

1. Software building apparatus for building a software system for use in control, monitoring and/or management of a process or apparatus, said apparatus comprising:
   i) at least one software module,
   ii) means for capturing data for loading to at least two copies of said module, the loaded modules each comprising a collaborative agent for use in said software system,
   iii) means for loading, or providing access to, at least two different collaboration strategies to at least one of said copies of said loaded module, for use by the respective collaborative software agent in use of the software system such that its collaboration behavior in the system is flexible, and
   iv) means for generating the software system comprising the collaborative software agents of ii) and iii) above.

2. Apparatus as in claim 1 wherein at least two of said loaded software modules hold different data determined by different entities represented by said modules.

3. Apparatus as in claim 1 wherein said at least one collaborative software agent has at least two different collaboration strategies and is capable of operating according to more than one collaboration strategy over the same time period, such that it operates according to at least the two different strategies effectively in parallel.

4. An exception handler for use in apparatus as in claim 1 wherein the data to be loaded to at least one copy of a module includes task definition data, defining resources and other variables of tasks to be distributed between multiple loaded copies of software modules for use in said software system, wherein said task definitions include one or more constraints on one or more variables and the exception handler flags an exception when a variable conflicts with a relevant constraint during use of the system.

5. An exception handler for use in apparatus as in claim 1 wherein the data to be loaded to at least one copy of a module includes scheduling data for tasks, defining resource and time constraints in relation to a task, and the exception handler flags an exception when the resource and time constraints cannot be met by allocation of tasks between the software modules.

6. Software building apparatus as in claim 1, wherein the software module comprises a collaboration engine for running a collaboration strategy in use of a collaborative software agent comprising a loaded copy of said module.

7. Software building apparatus as in claim 6 wherein a collaboration strategy comprises a graph description.

8. Software building apparatus as in claim 7 wherein the graph description describes a set of states, identified by nodes, and a set for arcs for traversing between specified states, each node and each arc identifying at least one process.

9. Software building apparatus as in claim 8 wherein at least one arc identifies a graph description.

10. Software building apparatus as in claim 8 wherein the collaboration engine is adapted to run a collaboration strategy, in use of the software system, by selecting a first node of the associated graph description, instantiating and running a process identified by the node, instantiating and running a process identified by an arc associated with the node, thereby traversing to a second node, and repeating the process until the end of the graph description.

11. Software building apparatus as in claim 10 wherein:
   the at least one collaborative software agent having at least two different collaboration strategies is capable of operating according to more than one collaboration strategy over the same time period, such that it operates according to at least two different strategies effectively in parallel,
   the collaboration engine being adapted to run the collaboration strategies by selecting a node from each of the strategies, instantiating and running processes identified by all the selected nodes, then traversing to a next node from each of the strategies and instantiating and running processes identified by all the next nodes, repeating the process until the end of each graph description associated with a collaboration strategy being run in parallel.

12. A software system for use in control, monitoring and/or management of a process or apparatus, wherein said system comprises at least two software modules, each module comprising data and/or process information which comprises:

(i) organisation data concerning an inter-module relationship;

(ii) executable software providing at least two intermodule collaboration strategies; and wherein, in use, a module selects at least one of said strategies for use in negotiating with another software module in relation to task allocation, such that its collaboration behaved in the system is flexible, said selection being determined at least in part by said organisation data.

13. A software system as in claim 12, wherein at least two of said software modules hold different data, determined by different entities represented by said modules.

14. A software system as in claim 12 wherein at least one module, comprising executable software providing at least two different collaboration strategies, is capable of operating according to more than one collaboration strategy over the same time period, such that it operates according to at least two different strategies effectively in parallel.

15. A software system as in claim 12, wherein each module comprises a collaboration engine for running a collaboration strategy in use of the system.

16. A software system as in claim 12 wherein a collaboration strategy comprises a graph description.

17. A software system as in claim 16 wherein the graph description describes a set of states, identified by nodes, and a set for arcs for traversing between specified states, each node and each arc identifying at least one process.

18. A software system as in claim 17 wherein at least one arc identifies a graph description.

19. A software system as in claim 17 wherein the collaboration engine is adapted to run a collaboration strategy, in use of the software system, by selecting a first node of the associated graph description, instantiating and running a process identified by the node, instantiating and running a process identified by an arc associated with the node, thereby traversing to a second node, and repeating the process until the end of the graph description.

20. A software system as in claim 19 wherein:

at least one module, comprising executable software providing at least two different collaboration strategies, is capable of operating according to more than one collaboration strategy over the same time period, such that it operates according to at least two different strategies effectively in parallel, the collaboration engine of the at least one module being adapted to run the collaboration strategies by selecting a node from each of the strategies, instantiating and running processes identified by all the selected nodes, then traversing to a next node from each of the strategies and instantiating and running processes identified by all the next nodes, repeating the process until the end of each graph description associated with a collaboration strategy being run in parallel.

21. A method for building a software system for use in control, monitoring and/or management of a process or apparatus, said method comprising:

i) capturing data for loading to at least two copies of a software module, the loaded modules each comprising a collaborative agent for use in said software system, ii) loading, or providing access to, at least two different collaboration strategies to at least one of said loaded copies of said module, for use by the respective collaborative software agent in use of the software system such that its behavior in the system is flexible, and iii) generating the software system comprising the collaborative software agents of i) and ii) above.

22. A method as in claim 21 wherein at least two of said loaded software modules hold different data determined by different entities represented by said modules.

23. A method as in claim 21 wherein said at least one collaborative software agent has at least two different collaboration strategies and is capable of operating according to more than one collaboration strategy over the same time period, such that it operates according to at least the two different strategies effectively in parallel.

24. An exception handler method for use in a software building method as in claim 21 wherein the data to be loaded to at least one copy of a module includes task definition data, defining resources and other variables of tasks to be distributed between multiple loaded copies of software modules for use in said software system, wherein said task definitions include one or more constraints on one or more variables and the exception handler flags an exception when a variable conflicts with a relevant constraint during use of the system.

25. An exception handler method for use in a software building system as in claim 21 wherein the data to be loaded to at least one copy of a module includes scheduling data for tasks, defining resource and time constraints in relation to a task, and the exception handler flags an exception when the resource and time constraints cannot be met by allocation of tasks between the software modules.

26. A method as in claim 21 wherein the software module comprises a collaboration engine for running a collaboration strategy in use of a collaborative software agent comprising a loaded copy of said module.

27. A method as in claim 26 wherein a collaboration strategy comprises a graph description.

28. A method as in claim 27 wherein the graph description describes a set of states, identified by nodes, and a set for arcs for traversing between specified states, each node and each are arc identifying at least one process.

29. A method as in claim 28 wherein at least one arc identifies a graph description.

30. A method as in claim 28 wherein the collaboration engine is adapted to run a collaboration strategy, in use of the software system, by selecting a first node of the associated graph description, instantiating and running a process identified by the node, instantiating and running a process identified by an arc associated with the node, thereby traversing to a second node, and repeating the process until the end of the graph description.

31. A method as in claim 30 wherein:

the at least one collaborative software agent having at least two different collaboration strategies is capable of operating according to more than one collaboration strategy over the same time period, such that it operates according to at least the two different strategies effectively in parallel, the collaboration engine being adapted to run the collaboration strategies by selecting a node from each of the strategies, instantiating and running processes identified by all the selected nodes, then traversing to a next node from each of the strategies and instantiating and running processes identified by all the next nodes, repeating the process until the end of each graph description associated with a collaboration strategy being run in parallel.

32. A method for using software in control, monitoring and/or management of a process or apparatus, wherein said method uses at least two software modules, each module comprising data and/or process information which comprises:

(i) organization data concerning an inter-module relationship; and (ii) executable software providing at least two inter-module collaboration strategies;

wherein, in use, a module selects at least one of said inter-module collaboration strategies for use in negotiating with another software module in relation to task allocation such that its collaboration behavior in the system is flexible, said selection being determined at least in part by said organization data.

33. A method as in claim 32, wherein at least two of said software modules hold different data, determined by different entities represented by said modules.

34. A method as in claim 32 wherein at least one module, comprising executable software providing at least two different collaboration strategies, is capable of operating according to more than one collaboration strategy over the same time period, such that it operates according to at least the two different strategies effectively in parallel.

35. A method as in claim 32, wherein each module comprises a collaboration engine for running a collaboration strategy in use of the system.

36. A method as in claim 32 wherein a collaboration strategy comprises a graph description.

37. A method as in claim 36 wherein the graph description describes a set of states, identified by nodes, and a set for arcs for traversing between specified states, each node and each arc identifying at least one process.

38. A method as in claim 37 wherein at least one arc identifies a graph description.

39. A method as in claim 37 wherein the collaboration engine is adapted to run a collaboration strategy, in use of the software system, by selecting a first node of the associated graph description, instantiating and running a process identified by the node, instantiating and running a process identified by an arc associated with the node, thereby traversing to a second node, and repeating the process until the end of the graph description.

40. A method as in claim 39 wherein:

at least one module, comprising executable software providing at least two different collaboration strategies, is capable of operating according to more than one collaboration strategy over the same time period, such that it operates according to at least tie two different strategies effectively in parallel, the collaboration engine of the at least one module being adapted to run the collaboration strategies by selecting a node from each of the strategies, instantiating and running processes identified by all the selected nodes, then traversing to a next node from each of the strategies and instantiating and running processes identified by all the next nodes, repeating the process until the end of each graph description associated with a collaboration strategy being run in parallel.

\* \* \* \* \*